(12) United States Patent
Dropps et al.

(10) Patent No.: US 7,684,401 B2
(45) Date of Patent: Mar. 23, 2010

(54) METHOD AND SYSTEM FOR USING EXTENDED FABRIC FEATURES WITH FIBRE CHANNEL SWITCH ELEMENTS

(75) Inventors: Frank R. Dropps, Maple Grove, MN (US); Craig M. Verba, Maple Grove, MN (US); Gary M. Papenfuss, St. Paul, MN (US); Ernest G. Kohlwey, Eagan, MN (US); Edward C. Ross, Edina, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1424 days.

(21) Appl. No.: 10/894,547

(22) Filed: Jul. 20, 2004

(65) Prior Publication Data

US 2005/0018673 A1  Jan. 27, 2005

Related U.S. Application Data

(60) Provisional application No. 60/503,812, filed on Sep. 19, 2003, provisional application No. 60/537,933, filed on Jan. 21, 2004, provisional application No. 60/488,757, filed on Jul. 21, 2003, provisional application No. 60/532,965, filed on Dec. 29, 2003, provisional application No. 60/504,038, filed on Sep. 19, 2003, provisional application No. 60/495,212, filed on Aug. 14, 2003, provisional application No. 60/495,165, filed on Aug. 14, 2003, provisional application No. 60/503,809, filed on Sep. 19, 2003, provisional application No. 60/505,381, filed on Sep. 23, 2003, provisional application No. 60/505,195, filed on Sep. 23, 2003, provisional application No. 60/557,613, filed on Mar. 30, 2004, provisional application No. 60/505,075, filed on Sep. 23, 2003, provisional application No. 60/504,950, filed on Sep. 19, 2003, provisional application No. 60/532,967, filed on Dec. 29, 2003, provisional application No. 60/532,966, filed on Dec. 29, 2003, provisional application No. 60/550,250, filed on Mar. 4, 2004, provisional application No. 60/569,436, filed on May 7, 2004, provisional application No. 60/572,197, filed on May 18, 2004, provisional application No. 60/532,963, filed on Dec. 29, 2003.

(51) Int. Cl.
*H04L 12/56* (2006.01)

(52) U.S. Cl. .................. 370/392; 370/397; 370/395.31; 370/395.72; 370/471; 370/474; 370/475; 709/246; 398/57

(58) Field of Classification Search ................. 370/351, 370/389, 392, 400, 401, 395.31, 395.72, 370/404, 470–472, 474, 475, 397; 398/45, 398/57; 709/246, 226
See application file for complete search history.

(56) References Cited

U.S. PATENT DOCUMENTS 4,081,612 A  3/1978  Hafner
(Continued)

FOREIGN PATENT DOCUMENTS

EP  0649098  9/1994
(Continued)

OTHER PUBLICATIONS

Banks, David C., et al., "Link Trunking and Measuring Link Latency in Fibre Channel Fabric", U.S. Appl. No. 60/286,046, 1-52.
(Continued)

*Primary Examiner*—Kwang B Yao
*Assistant Examiner*—Jeffrey M Rutkowski
(74) *Attorney, Agent, or Firm*—Klein, O'Neill & Singh, LLP

(57) ABSTRACT

A fiber channel switch element and method for routing fiber channel frames is provided. The switch element includes a receive segment that can add a virtual storage area network ("VSAN") tagging header to frames that are received by the receive segment; and strip the VSAN tagging header before frames are sent to ports that do not support virtual fabric capability. The receive segment includes a table used for matching fabric extension parameters. An incoming frame's VSAN identity value is compared to a control word entry to generate a value used for routing the incoming frame. The table is used to determine if a frame is part of a virtual fabric. The routing table for each port is used to route frames and the routing table includes entries for supported virtual fabrics.

2 Claims, 23 Drawing Sheets

U.S. PATENT DOCUMENTS

| | | | |
|---|---|---|---|
| 4,162,375 A | 7/1979 | Schlichte | 179/15 |
| 4,200,929 A | 4/1980 | Davidjuk et al. | |
| 4,258,418 A | 3/1981 | Heath | |
| 4,344,132 A | 8/1982 | Dixon et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,691,296 A | 9/1987 | Struger | |
| 4,716,561 A | 12/1987 | Angell et al. | |
| 4,725,835 A | 2/1988 | Schreiner et al. | 340/825.83 |
| 4,821,034 A | 4/1989 | Anderson et al. | 340/825 |
| 4,860,193 A | 8/1989 | Bentley et al. | |
| 4,964,119 A | 10/1990 | Endo et al. | |
| 4,980,857 A | 12/1990 | Walter et al. | |
| 5,025,370 A | 6/1991 | Koegel et al. | |
| 5,051,742 A | 9/1991 | Hullett et al. | |
| 5,090,011 A | 2/1992 | Fukuta et al. | |
| 5,115,430 A | 5/1992 | Hahne et al. | |
| 5,144,622 A | 9/1992 | Takiyasu et al. | 370/85.13 |
| 5,258,751 A | 11/1993 | DeLuca et al. | |
| 5,260,933 A | 11/1993 | Rouse | |
| 5,260,935 A | 11/1993 | Turner | |
| 5,280,483 A | 1/1994 | Kamoi et al. | |
| 5,291,481 A | 3/1994 | Doshi et al. | |
| 5,339,311 A | 8/1994 | Turner | |
| 5,367,520 A | 11/1994 | Cordell | 370/60 |
| 5,390,173 A | 2/1995 | Spinney et al. | |
| 5,425,022 A | 6/1995 | Clark et al. | |
| 5,537,400 A | 7/1996 | Diaz et al. | |
| 5,568,165 A | 10/1996 | Kimura | |
| 5,568,167 A | 10/1996 | Galbi et al. | |
| 5,568,614 A | 10/1996 | Mendelson et al. | |
| 5,579,443 A | 11/1996 | Tatematsu et al. | |
| 5,590,125 A | 12/1996 | Acampora et al. | |
| 5,594,672 A | 1/1997 | Hicks | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,638,518 A | 6/1997 | Malladi | |
| 5,666,483 A | 9/1997 | McClary | |
| 5,677,909 A | 10/1997 | Heide | |
| 5,687,172 A | 11/1997 | Cloonan et al. | 370/395 |
| 5,701,416 A | 12/1997 | Thorson et al. | |
| 5,706,279 A | 1/1998 | Teraslinna | |
| 5,732,206 A | 3/1998 | Mendel | |
| 5,748,612 A | 5/1998 | Stoevhase et al. | 370/230 |
| 5,751,710 A | 5/1998 | Crowther et al. | |
| 5,757,771 A | 5/1998 | Li et al. | |
| 5,764,927 A | 6/1998 | Murphy et al. | |
| 5,768,271 A | 6/1998 | Seid et al. | |
| 5,768,533 A | 6/1998 | Ran | |
| 5,784,358 A | 7/1998 | Smith et al. | |
| 5,790,545 A | 8/1998 | Holt et al. | |
| 5,790,840 A | 8/1998 | Bulka et al. | |
| 5,812,525 A | 9/1998 | Teraslinna | |
| 5,818,842 A | 10/1998 | Burwell et al. | 370/397 |
| 5,821,875 A | 10/1998 | Lee et al. | |
| 5,822,300 A | 10/1998 | Johnson et al. | |
| 5,825,748 A | 10/1998 | Barkey et al. | |
| 5,828,475 A | 10/1998 | Bennett et al. | |
| 5,835,748 A | 11/1998 | Orenstein et al. | |
| 5,835,752 A | 11/1998 | Chiang et al. | |
| 5,850,386 A | 12/1998 | Anderson et al. | |
| 5,892,604 A | 4/1999 | Yamanaka et al. | |
| 5,894,560 A | 4/1999 | Carmichael et al. | |
| 5,925,119 A | 7/1999 | Maroney | |
| 5,936,442 A | 8/1999 | Liu et al. | |
| 5,954,796 A | 9/1999 | McCarty et al. | |
| 5,974,547 A | 10/1999 | Klimenko | |
| 5,978,359 A | 11/1999 | Caldara et al. | |
| 5,978,379 A | 11/1999 | Chan et al. | |
| 5,987,028 A | 11/1999 | Yang et al. | 370/380 |
| 5,999,528 A | 12/1999 | Chow et al. | 370/365 |
| 6,009,226 A | 12/1999 | Tsuji et al. | |
| 6,011,779 A | 1/2000 | Wills | |
| 6,014,383 A | 1/2000 | McCarty | 370/453 |
| 6,021,128 A | 2/2000 | Hosoya et al. | 370/380 |
| 6,026,092 A | 2/2000 | Abu-Amara et al. | |
| 6,031,842 A | 2/2000 | Trevitt et al. | |
| 6,046,979 A | 4/2000 | Bauman | |
| 6,047,323 A | 4/2000 | Krause | 709/227 |
| 6,055,618 A | 4/2000 | Thorson | |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,118,791 A | 9/2000 | Fichou et al. | |
| 6,128,292 A | 10/2000 | Kim et al. | 370/356 |
| 6,131,123 A | 10/2000 | Hurst et al. | |
| 6,134,127 A | 10/2000 | Kirchberg | |
| 6,144,668 A | 11/2000 | Bass et al. | |
| 6,147,976 A * | 11/2000 | Shand et al. | 370/254 |
| 6,148,421 A | 11/2000 | Hoese et al. | |
| 6,151,644 A | 11/2000 | Wu | |
| 6,158,014 A | 12/2000 | Henson | |
| 6,160,813 A | 12/2000 | Banks et al. | 370/422 |
| 6,185,203 B1 | 2/2001 | Berman | |
| 6,201,787 B1 | 3/2001 | Baldwin et al. | |
| 6,209,089 B1 | 3/2001 | Selitrennikoff et al. | |
| 6,229,822 B1 | 5/2001 | Chow et al. | |
| 6,230,276 B1 | 5/2001 | Hayden | |
| 6,240,096 B1 | 5/2001 | Book | |
| 6,252,891 B1 | 6/2001 | Perches | |
| 6,253,267 B1 | 6/2001 | Kim et al. | |
| 6,278,708 B1 | 8/2001 | Von Hammerstein et al. | |
| 6,286,011 B1 | 9/2001 | Velamuri et al. | |
| 6,289,002 B1 | 9/2001 | Henson et al. | |
| 6,301,612 B1 | 10/2001 | Selitrennikoff et al. | |
| 6,307,857 B1 | 10/2001 | Yokoyama et al. | |
| 6,308,220 B1 | 10/2001 | Mathur | 709/238 |
| 6,311,204 B1 | 10/2001 | Mills et al. | |
| 6,324,181 B1 | 11/2001 | Wong et al. | 370/403 |
| 6,330,236 B1 | 12/2001 | Ofek et al. | 370/369 |
| 6,333,932 B1 | 12/2001 | Kobayasi et al. | |
| 6,335,935 B2 | 1/2002 | Kadambi et al. | |
| 6,343,324 B1 | 1/2002 | Hubis et al. | |
| 6,353,612 B1 | 3/2002 | Zhu et al. | |
| 6,370,605 B1 | 4/2002 | Chong | |
| 6,397,360 B1 | 5/2002 | Bruns | |
| 6,401,128 B1 | 6/2002 | Stai et al. | |
| 6,404,749 B1 | 6/2002 | Falk | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,342 B1 | 7/2002 | Schwartz et al. | |
| 6,421,711 B1 | 7/2002 | Blumenau et al. | |
| 6,424,658 B1 | 7/2002 | Mathur | 370/429 |
| 6,438,628 B1 | 8/2002 | Messerly et al. | |
| 6,449,274 B1 | 9/2002 | Holden et al. | 370/392 |
| 6,452,915 B1 | 9/2002 | Jorgensen | |
| 6,467,008 B1 | 10/2002 | Gentry | 710/261 |
| 6,470,026 B1 | 10/2002 | Pearson et al. | |
| 6,480,500 B1 | 11/2002 | Erimli et al. | |
| 6,509,988 B1 | 1/2003 | Saito | |
| 6,522,656 B1 * | 2/2003 | Gridley | 370/428 |
| 6,532,212 B1 | 3/2003 | Soloway et al. | |
| 6,553,036 B1 | 4/2003 | Miller et al. | |
| 6,563,796 B1 | 5/2003 | Saito | |
| 6,570,850 B1 | 5/2003 | Gutierrez et al. | |
| 6,570,853 B1 | 5/2003 | Johnson et al. | |
| 6,594,231 B1 | 7/2003 | Byham et al. | |
| 6,597,691 B1 | 7/2003 | Anderson et al. | 370/360 |

| Patent | Type | Date | Inventor(s) |
|---|---|---|---|
| 6,606,690 | B2 | 8/2003 | Padovano |
| 6,614,796 | B1 | 9/2003 | Black et al. |
| 6,622,206 | B1 | 9/2003 | Kanamaru et al. |
| 6,629,161 | B2 | 9/2003 | Matsuki et al. |
| 6,643,298 | B1 | 11/2003 | Brunheroto et al. |
| 6,657,962 | B1 | 12/2003 | Barri et al. |
| 6,684,209 | B1 | 1/2004 | Ito et al. |
| 6,697,359 | B1 | 2/2004 | George .................. 370/357 |
| 6,697,368 | B2 | 2/2004 | Chang et al. |
| 6,697,914 | B1 | 2/2004 | Hospodor et al. |
| 6,700,877 | B1 | 3/2004 | Lorenz et al. |
| 6,718,497 | B1 | 4/2004 | Whitby-Strevens |
| 6,738,381 | B1 | 5/2004 | Agnevik et al. |
| 6,744,772 | B1 | 6/2004 | Eneboe et al. |
| 6,760,302 | B1 | 7/2004 | Ellinas et al. |
| 6,765,871 | B1 | 7/2004 | Knobel et al. |
| 6,779,083 | B2 | 8/2004 | Ito et al. |
| 6,785,241 | B1 | 8/2004 | Lu et al. |
| 6,807,181 | B1 | 10/2004 | Weschler |
| 6,816,492 | B1 | 11/2004 | Turner et al. |
| 6,816,750 | B1 | 11/2004 | Klaas |
| 6,859,435 | B1 | 2/2005 | Lee et al. |
| 6,865,157 | B1 | 3/2005 | Scott et al. |
| 6,888,831 | B1 | 5/2005 | Hospodor et al. |
| 6,901,072 | B1 * | 5/2005 | Wong ..................... 370/389 |
| 6,904,507 | B2 | 6/2005 | Gil |
| 6,922,408 | B2 | 7/2005 | Bloch et al. |
| 6,865,155 | B1 | 8/2005 | Wong et al. |
| 6,928,470 | B1 | 8/2005 | Hamlin |
| 6,934,799 | B2 | 8/2005 | Acharya et al. |
| 6,941,357 | B2 | 9/2005 | Nguyen et al. |
| 6,941,482 | B2 | 9/2005 | Strong |
| 6,947,393 | B2 | 9/2005 | Hooper, III |
| 6,952,659 | B2 | 10/2005 | King et al. |
| 6,968,463 | B2 | 11/2005 | Pherson et al. |
| 6,975,627 | B1 | 12/2005 | Parry et al. |
| 6,983,342 | B2 | 1/2006 | Helenic et al. |
| 6,987,768 | B1 | 1/2006 | Kojima et al. |
| 6,988,130 | B2 | 1/2006 | Blumenau et al. |
| 6,988,149 | B2 | 1/2006 | Odenwald |
| 7,000,025 | B1 | 2/2006 | Wilson |
| 7,002,926 | B1 | 2/2006 | Eneboe et al. |
| 7,010,607 | B1 | 3/2006 | Bunton |
| 7,024,410 | B2 | 4/2006 | Ito et al. |
| 7,031,615 | B2 | 4/2006 | Genrile |
| 7,039,070 | B2 | 5/2006 | Kawakatsu |
| 7,039,870 | B2 | 5/2006 | Takaoka et al. |
| 7,047,326 | B1 | 5/2006 | Crosbie et al. |
| 7,050,392 | B2 | 5/2006 | Valdevit |
| 7,051,182 | B2 | 5/2006 | Blumenau et al. |
| 7,055,068 | B2 | 5/2006 | Riedl |
| 7,061,862 | B2 | 6/2006 | Horiguchi et al. |
| 7,061,871 | B2 | 6/2006 | Sheldon et al. |
| 7,076,569 | B1 | 7/2006 | Bailey et al. |
| 7,082,126 | B2 | 7/2006 | Ain et al. |
| 7,092,374 | B1 | 8/2006 | Gubbi |
| 7,110,394 | B1 | 9/2006 | Chamdani et al. |
| 7,120,728 | B2 | 10/2006 | Krakirian et al. |
| 7,123,306 | B1 | 10/2006 | Goto et al. |
| 7,124,169 | B2 | 10/2006 | Shimozono et al. |
| 7,150,021 | B1 | 12/2006 | Vajjhala et al. |
| 7,151,778 | B2 | 12/2006 | Zhu et al. |
| 7,171,050 | B2 | 1/2007 | Kim |
| 7,185,062 | B2 | 2/2007 | Lolayekar et al. |
| 7,187,688 | B2 | 3/2007 | Garmire et al. |
| 7,188,364 | B2 | 3/2007 | Volpano |
| 7,190,667 | B2 | 3/2007 | Susnow et al. |
| 7,194,538 | B1 | 3/2007 | Rabe et al. |
| 7,200,108 | B2 | 4/2007 | Beer et al. |
| 7,200,610 | B1 | 4/2007 | Prawdiuk et al. |
| 7,209,478 | B2 | 4/2007 | Rojas et al. |
| 7,215,680 | B2 | 5/2007 | Mullendore et al. |
| 7,221,650 | B1 | 5/2007 | Cooper et al. |
| 7,230,929 | B2 | 6/2007 | Betker et al. |
| 7,233,570 | B2 | 6/2007 | Gregg |
| 7,233,985 | B2 | 6/2007 | Hahn et al. |
| 7,239,641 | B1 * | 7/2007 | Banks et al. ............... 370/397 |
| 7,245,613 | B1 | 7/2007 | Winkles et al. |
| 7,245,627 | B2 | 7/2007 | Goldenberg et al. |
| 7,248,580 | B2 | 7/2007 | George et al. |
| 7,263,593 | B2 | 8/2007 | Honda et al. |
| 7,266,286 | B2 | 9/2007 | Tanizawa et al. |
| 7,269,131 | B2 | 9/2007 | Cashman et al. |
| 7,269,168 | B2 | 9/2007 | Roy et al. |
| 7,277,431 | B2 | 10/2007 | Walter et al. |
| 7,287,063 | B2 | 10/2007 | Baldwin et al. |
| 7,292,593 | B1 | 11/2007 | Winkles et al. |
| 7,315,511 | B2 | 1/2008 | Morita et al. |
| 7,319,669 | B1 | 1/2008 | Kunz et al. |
| 7,327,680 | B1 | 2/2008 | Kloth |
| 7,334,046 | B1 | 2/2008 | Betker |
| 7,346,707 | B1 | 3/2008 | Erimli |
| 7,352,701 | B1 | 4/2008 | Kunz |
| 7,352,740 | B2 | 4/2008 | Hammons et al. |
| 7,397,788 | B2 * | 7/2008 | Mies et al. ................. 370/351 |
| 7,406,034 | B1 * | 7/2008 | Cometto et al. ............ 370/218 |
| 7,406,092 | B2 | 7/2008 | Dropps et al. |
| 7,424,533 | B1 * | 9/2008 | Di Benedetto et al. ...... 709/226 |
| 7,443,794 | B2 | 10/2008 | George et al. |
| 7,460,534 | B1 | 12/2008 | Ballenger |
| 7,466,700 | B2 | 12/2008 | Dropps et al. |
| 7,471,691 | B2 | 12/2008 | Black et al. |
| 7,492,780 | B1 | 2/2009 | Goolsby |
| 2001/0011357 | A1 | 8/2001 | Mori |
| 2001/0022823 | A1 | 9/2001 | Renaud |
| 2001/0033552 | A1 | 10/2001 | Barrack et al. |
| 2001/0038628 | A1 | 11/2001 | Ofek et al. ................. 370/392 |
| 2001/0043564 | A1 | 11/2001 | Bloch et al. |
| 2001/0047460 | A1 | 11/2001 | Kobayashi et al. |
| 2002/0016838 | A1 | 2/2002 | Geluc et al. |
| 2002/0034178 | A1 | 3/2002 | Schmidt et al. |
| 2002/0071387 | A1 | 6/2002 | Horiguchi et al. |
| 2002/0103913 | A1 | 8/2002 | Tawil et al. |
| 2002/0104039 | A1 | 8/2002 | DeRolf et al. |
| 2002/0118692 | A1 | 8/2002 | Oberman et al. |
| 2002/0122428 | A1 | 9/2002 | Fan et al. |
| 2002/0124102 | A1 | 9/2002 | Kramer et al. |
| 2002/0124124 | A1 | 9/2002 | Matsumoto et al. |
| 2002/0147560 | A1 | 10/2002 | Devins et al. |
| 2002/0147843 | A1 | 10/2002 | Rao |
| 2002/0156918 | A1 | 10/2002 | Valdevit et al. |
| 2002/0159385 | A1 | 10/2002 | Susnow et al. |
| 2002/0172195 | A1 | 11/2002 | Pekkala et al. |
| 2002/0174197 | A1 | 11/2002 | Schimke et al. |
| 2002/0191602 | A1 | 12/2002 | Woodring et al. |
| 2002/0194294 | A1 | 12/2002 | Blumenau et al. |
| 2002/0196773 | A1 | 12/2002 | Berman |
| 2003/0002503 | A1 | 1/2003 | Brewer et al. |
| 2003/0002516 | A1 | 1/2003 | Boock et al. |
| 2003/0016683 | A1 | 1/2003 | George et al. |
| 2003/0021239 | A1 | 1/2003 | Mullendore et al. |
| 2003/0026267 | A1 | 2/2003 | Oberman et al. |
| 2003/0026287 | A1 | 2/2003 | Mullendore et al. |
| 2003/0033487 | A1 | 2/2003 | Pfister et al. |
| 2003/0035433 | A1 | 2/2003 | Craddock et al. |
| 2003/0037159 | A1 | 2/2003 | Zhao et al. |
| 2003/0046396 | A1 | 3/2003 | Richter et al. |
| 2003/0056000 | A1 | 3/2003 | Mullendore et al. |
| 2003/0063567 | A1 | 4/2003 | Dehart |
| 2003/0072316 | A1 | 4/2003 | Niu et al. |
| 2003/0076788 | A1 | 4/2003 | Grabauskas et al. |
| 2003/0079019 | A1 | 4/2003 | Lolayekar et al. |
| 2003/0084219 | A1 | 5/2003 | Yao et al. |
| 2003/0086377 | A1 | 5/2003 | Berman |
| 2003/0091062 | A1 | 5/2003 | Lay et al. |
| 2003/0093607 | A1 | 5/2003 | Main et al. |

| | | |
|---|---|---|
| 2003/0103451 A1 | 6/2003 | Lutgen et al. |
| 2003/0112819 A1 | 6/2003 | Kofoed et al. |
| 2003/0115355 A1 | 6/2003 | Cometto et al. |
| 2003/0117961 A1 | 6/2003 | Chuah et al. |
| 2003/0118053 A1* | 6/2003 | Edsall et al. ............... 370/474 |
| 2003/0120743 A1 | 6/2003 | Coatney et al. |
| 2003/0120791 A1 | 6/2003 | Weber et al. |
| 2003/0120983 A1 | 6/2003 | Vieregge et al. |
| 2003/0126223 A1 | 7/2003 | Jenne et al. |
| 2003/0126242 A1 | 7/2003 | Chang |
| 2003/0131105 A1* | 7/2003 | Czeiger et al. .............. 709/225 |
| 2003/0137941 A1 | 7/2003 | Kaushik et al. |
| 2003/0139900 A1 | 7/2003 | Robison |
| 2003/0152076 A1 | 8/2003 | Lee et al. |
| 2003/0172149 A1 | 9/2003 | Edsall et al. |
| 2003/0172239 A1 | 9/2003 | Swank |
| 2003/0174652 A1 | 9/2003 | Ebata |
| 2003/0174721 A1 | 9/2003 | Black et al. |
| 2003/0174789 A1 | 9/2003 | Waschura et al. |
| 2003/0179709 A1 | 9/2003 | Huff |
| 2003/0179748 A1* | 9/2003 | George et al. ............... 370/389 |
| 2003/0179755 A1 | 9/2003 | Fraser |
| 2003/0189930 A1 | 10/2003 | Terrell et al. |
| 2003/0189935 A1* | 10/2003 | Warden et al. ......... 370/395.21 |
| 2003/0191857 A1 | 10/2003 | Terrell et al. |
| 2003/0191883 A1 | 10/2003 | April |
| 2003/0195983 A1 | 10/2003 | Krause |
| 2003/0198238 A1 | 10/2003 | Westby |
| 2003/0200315 A1 | 10/2003 | Goldenberg et al. |
| 2003/0218986 A1 | 11/2003 | DeSanti et al. |
| 2003/0229808 A1 | 12/2003 | Heintz et al. |
| 2003/0236953 A1 | 12/2003 | Grieff et al. |
| 2004/0013088 A1 | 1/2004 | Gregg |
| 2004/0013092 A1 | 1/2004 | Betker et al. |
| 2004/0013113 A1 | 1/2004 | Singh et al. |
| 2004/0013125 A1 | 1/2004 | Betker et al. |
| 2004/0015638 A1 | 1/2004 | Forbes |
| 2004/0024831 A1 | 2/2004 | Yang et al. |
| 2004/0027989 A1 | 2/2004 | Martin et al. |
| 2004/0028038 A1 | 2/2004 | Anderson et al. |
| 2004/0054776 A1 | 3/2004 | Klotz et al. |
| 2004/0054866 A1 | 3/2004 | Blumenau et al. |
| 2004/0057389 A1 | 3/2004 | Klotz et al. |
| 2004/0064664 A1 | 4/2004 | Gil |
| 2004/0081186 A1 | 4/2004 | Warren et al. |
| 2004/0081196 A1* | 4/2004 | Elliott ........................ 370/465 |
| 2004/0081394 A1 | 4/2004 | Biren et al. |
| 2004/0085955 A1 | 5/2004 | Walter et al. |
| 2004/0085974 A1 | 5/2004 | Mies et al. |
| 2004/0085994 A1 | 5/2004 | Warren et al. |
| 2004/0092278 A1 | 5/2004 | Diepstraten et al. |
| 2004/0100944 A1 | 5/2004 | Richmond et al. |
| 2004/0109418 A1 | 6/2004 | Fedorkow et al. |
| 2004/0120340 A1 | 6/2004 | Furey et al. |
| 2004/0123181 A1 | 6/2004 | Moon et al. |
| 2004/0125799 A1 | 7/2004 | Buer |
| 2004/0141518 A1 | 7/2004 | Milligan et al. |
| 2004/0141521 A1 | 7/2004 | George ....................... 370/463 |
| 2004/0151188 A1 | 8/2004 | Maveli et al. |
| 2004/0153526 A1 | 8/2004 | Haun et al. |
| 2004/0153566 A1 | 8/2004 | Lalsangi et al. |
| 2004/0153863 A1 | 8/2004 | Klotz et al. |
| 2004/0153914 A1 | 8/2004 | El-Batal |
| 2004/0174813 A1 | 9/2004 | Kasper et al. |
| 2004/0202189 A1 | 10/2004 | Arndt et al. |
| 2004/0208201 A1 | 10/2004 | Otake |
| 2004/0218531 A1 | 11/2004 | Cherian et al. |
| 2004/0267982 A1 | 12/2004 | Jackson et al. |
| 2005/0023656 A1 | 2/2005 | Leedy |
| 2005/0036485 A1 | 2/2005 | Eilers et al. |
| 2005/0036499 A1 | 2/2005 | Dutt et al. |
| 2005/0036763 A1 | 2/2005 | Kato et al. |
| 2005/0047334 A1* | 3/2005 | Paul et al. .................... 370/229 |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0099970 A1 | 5/2005 | Halliday |
| 2005/0108444 A1 | 5/2005 | Flauaus et al. |
| 2005/0111845 A1 | 5/2005 | Nelson et al. |
| 2005/0117522 A1 | 6/2005 | Basavaiah et al. |
| 2005/0177641 A1 | 8/2005 | Yamagami |
| 2005/0188245 A1 | 8/2005 | Seto et al. |
| 2005/0198523 A1 | 9/2005 | Shanbhag et al. |
| 2006/0013248 A1 | 1/2006 | Mujeeb et al. |
| 2006/0034192 A1 | 2/2006 | Hurley et al. |
| 2006/0034302 A1 | 2/2006 | Peterson |
| 2006/0047852 A1 | 3/2006 | Shah et al. |
| 2006/0074927 A1 | 4/2006 | Sullivan et al. |
| 2006/0107260 A1 | 5/2006 | Motta |
| 2006/0143300 A1* | 6/2006 | See et al. .................... 709/227 |
| 2006/0184711 A1 | 8/2006 | Pettey |
| 2006/0203725 A1 | 9/2006 | Paul et al. |
| 2006/0274744 A1* | 12/2006 | Nagai et al. ................. 370/389 |
| 2007/0206502 A1 | 9/2007 | Martin et al. |

FOREIGN PATENT DOCUMENTS

| | | |
|---|---|---|
| EP | 0856969 | 1/1998 |
| WO | WO-98/36537 | 8/1998 |
| WO | WO-01/95566 | 12/2001 |
| WO | WO03/088050 | 10/2003 |

OTHER PUBLICATIONS

"Office Action from USPTO dated Dec. 7, 2007 for U.S. Appl. No. 10/961,463".

"Notice of Allowance from USPTO dated Dec. 21, 2007 for U.S. Appl. No. 10/961,463".

"Notice of Allowance from USPTO dated Dec. 20, 2007 for U.S. Appl. No. 10/889,337".

"Notice of Allowance from USPTO dated Jan. 8, 2008 for U.S. Appl. No. 10/889,551".

"Office Action from USPTO dated Jan. 9, 2008 for U.S. Appl. No. 10/798,468".

"Office Action from USPTO dated Jan. 9, 2008 for U.S. Appl. No. 11/608,634".

"Notice of Allowance from USPTO dated Jan. 11, 2008 for U.S. Appl. No. 10/664,548".

"Notice of Allowance from USPTO dated Jan. 10, 2008 for U.S. Appl. No. 10/263,858".

"Notice of Allowance from USPTO dated Feb. 8, 2008 for U.S. Appl. No. 10/894,529".

"Office Action from USPTO dated Feb. 12, 2008 for U.S. Appl. No. 11/057,912".

"Office Action from USPTO dated Mar. 5, 2008 for U.S. Appl. No. 10/889,259".

"Office Action from USPTO dated Mar. 7, 2008 for U.S. Appl. No. 10/894,629".

"Office Action from USPTO dated Mar. 20, 2008 for U.S. Appl. No. 10/894,732".

Curtis, A. R., "Design Considerations for 10-Gbit Fibre Channel", Curtis A. Ridgeway, *Distinguished I/O Architect, Storage and Computing ASIC's Division, LSI Logic Corp.*

Malavalli, Kumar, "High Speed Fibre Channel Switching Fabric Devices", *Proceedings of the SPIE, SPIE*, Bellingham, VA, USA vol. 1577,, XP000562869, ISSN: 0277-786X,(Sep. 4, 1991),216-226.

Melhem, et al., "Minimizing Wavelength Conversions in WDM Path Establishment", *Computer Science Department, University of Pittsburgh*, Pittsburgh, PA 15260, (2001),197-211.

Ridgeway, Curt, "0GFC-40GFC using 4-lane XAUI's", *LSI Logic Presentation—T11/03-069v0*.

"Notice of Allowance from USPTO dated Apr. 4, 2008 for U.S. Appl. No. 11/608,634".

"Office Action from USPTO dated Apr. 4, 2008 for U.S. Appl. No. 10/957,465".

"Notice Allowance from USPTO dated Apr. 10, 2008 for U.S. Appl. No. 10/241,153".

"Office Action from USPTO dated Apr. 11, 2008 for U.S. Appl. No. 10/894,595".
"Office Action from USPTO dated Apr. 14, 2008 for U.S. Appl. No. 10/894,627".
"Office Action from USPTO dated Apr. 17, 2008 for U.S. Appl. No. 10/894,689".
"Notice of Allowance from USPTO dated Apr. 18, 2008 for U.S. Appl. No. 10/894,597".
"Final Office Action from USPTO dated Apr. 23, 2008 for U.S. Appl. No. 10/889,255".
"Final Office Action from USPTO dated Apr. 25, 2008 for U.S. Appl. No. 10/894,579".
"Final Office Action from USPTO dated Apr. 29, 2008 for U.S. Appl. No. 10/894,491".
"Office Action from USPTO dated May 2, 2008 for U.S. Appl. No. 11/037,922".
"Final Office Action from USPTO dated May 12, 2008 for U.S. Appl. No. 10/894,492".
"Office Action from USPTO dated May 14, 2008 for U.S. Appl. No. 10/956,502".
"Office Action from USPTO dated May 15, 2008 for U.S. Appl. No. 10/798,527".
"Final Office Action from USPTO dated May 21, 2008 for U.S. Appl. No. 10/889,635".
"Final Office Action from USPTO dated Jun. 4, 2008 for U.S. Appl. No. 10/894,978".
"Final Office Action from USPTO dated Jun. 5, 2008 for U.S. Appl. No. 10/889,267".
"Final Office Action from USPTO dated Apr. 1, 2008 for U.S. Appl. No. 10/956,717".
"Office Action from USPTO dated Apr. 3, 2008 for U.S. Appl. No. 10/894,587".
"Deliver Server-Free Backup", *Pathlight & Computer Associates*, White Paper of Apr. 2000, Ithaca, New York, XP-002381153,1-8.
Naik, D., "Inside Windows Storage:Server Storage Technologies for Windows 2000, Windows Server 2003 and Beyond", *Addison-Wesley*, US, Chapter 5, XP-002381152, (Jul. 15, 2003),137-173.
International Preliminary Report on Patentability dated Apr. 3, 2007, for International patent application No. PCT/US2005/034844.
International Preliminary Report on Patentability dated Apr. 3, 2007, for International patent application No. PCT/US2005/034758.
International Preliminary Report on Patentability dated Apr. 11, 2007, for International patent application No. PCT/US2005/034845.
International Preliminary Report on Patentability dated Apr. 3, 2007, for International patent application No. PCT/US2005/035064.
International Preliminary Report on Patentability dated Jul. 24, 2007, for International patent application No. PCT/US2005/42528.
Brown, Douglas W., "A State-Machine Synthesizer", *18th Design Automation Conference*, (1981),301-305.
"Examination Report from the European Patent Office dated Oct. 12, 2007 for European Application No. 05 805 632.6".
"Office Action from USPTO dated Mar. 21, 2006 for U.S. Appl. No. 10/889,588".
"Office Action from USPTO dated Sep. 10, 2007 for U.S. Appl. No. 10/889,255".
"Office Action from USPTO dated Jul. 11, 2007 for U.S. Appl. No. 10/263,858".
"Office Action from USPTO dated Jan. 19, 2007 for U.S. Appl. No. 10/302,149".
"Office Action from USPTO dated Aug. 20, 2007 for U.S. Appl. No. 10/302,149".
"Office Action from USPTO dated Jul. 3, 2007 for U.S. Appl. No. 10/664,548".
"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".
Malavalli, et al., "Fibre Channel Framing and Signaling (FC-FS) REV 1.10", *NCITS working draft proposed American National Standard for Information Technology*, (Jan. 25, 2001).

"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Oct. 25, 2007 for U.S. Appl. No. 10/894,536".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTO dated Jun. 1, 2007 for U.S. Appl. No. 10/961,463".
"Office Action from USPTO dated Sep. 6, 2007 for U.S. Appl. No. 10/889,337".
"Office Action from USPTO dated Jan. 19, 2006 for U.S. Appl. No. 10/212,425".
"Office Action from USPTO dated Dec. 5, 2006 for U.S. Appl. No. 10/212,425".
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 6, 2007 for U.S. Appl. No. 10/241,153".
"Office Action from USPTO dated Nov. 15, 2006 for U.S. Appl. No. 10/263,858".
Clark, Tom, "Zoning for Fibre Channel Fabrics", Vixel Corporation Paper—XP002185194., (Aug. 1999), pp. 1-6.
Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.
Martin, Charles R., "Fabric Interconnection of fibre channel standard nodes", Proceedings of the SPIE, (Sep. 8, 1992), pp. 65-71.
Yoshida, Hu, "LUN Security Considerations for Storage Area Networks," Hitachi Data Systems Paper—XP 002185193 (1999), 1-7.
Claudio DeSanti, "Virtual Fabrics Switch Support" ; VF Switch Support, T11/04-395v2. Sep. 2004, pp. 1-15.
Pelissier et al, "Inter-Fabric Routing" , dated Jul. 30, 2004, Inter Fabric Routing (04-520v0); pp. 1-31.
DeSanti et al, "Virtual Fabrics"; Virtual Fabrics, T11/03-352v0, May 2003; pp. 1-4.
Martin et al , "Virtual Channel Architecture" , Presentation by Brocade to T11/03-369V0 dated Jun. 2, 2003.
U.S. Appl. No. 10/266,360, filed Oct. 7, 2002, Method and System for Reducing Congestion in Computer Networks.
U.S. Appl. No. 10/241,153, filed Sep. 11, 2001, Zone Managament in a Multi-Module Fibre Channel Switch.
U.S. Appl. No. 10/263,858, filed Oct. 2002, Method and System for Using Distributed Name Servers in Multi-Module Fibre Channel Switching.

U.S. Appl. No. 10/212,425, filed Aug. 5, 2002, Method and System for Flexible Routing in a Fibre Channel System.
U.S. Appl. No. 10/302,149, filed Nov. 22, 2002, Method and System for Controlling Packet Flow in Networks.
U.S. Appl. No. 10/894,579, filed Jul. 20, 2004, Method and System for Managing Traffic in Fibre Channel Switches.
U.S. Appl. No. 10/894,546, filed Jul. 20, 2004, Method and System for Routing and Filtering Network Data Packets in Fibre Channel Systems.
U.S. Appl. No. 10/894,827, filed Jul. 20, 2004, Method and System for Selecting Virtual Lanes in Fibre Channel Switches.
U.S. Appl. No. 10/894,597, filed Jul. 20, 2004, Programmable Pseudo Virtual Lanes for Fibre Channel Systems.
U.S. Appl. No. 10/894,595, filed Jul. 20, 2004, Method and System for Reducing Latency and Congestion in Fibre Channel Switches.
U.S. Appl. No. 10/664,548, filed Sep. 19, 2003, Buffer to Buffer Credit Recovery for In-Line Fibre Channel Credit Extension Devices.
U.S. Appl. No. 10/895,175, filed Jul. 20, 2004, Method and System for Detecting Congestion and Over Subscription in a Fibre Channel Network.
U.S. Appl. No. 10/894,492, filed Jul. 20, 2004, LUN Based Hard Zoning in Fibre Channel Switches.
U.S. Appl. No. 10/894,587, filed Jul. 20, 2004, Multi Speed Cut Through Operation in Fibre Channel Switches.
U.S. Appl. No. 10/894,726, filed Jul. 20, 2004, Method and System for Improving Bandwidth & Reducing Idles in Fibre Channel Switches.
U.S. Appl. No. 10/894,629, filed Jul. 20, 2004, Method and System for Routing Fibre Channel Systems.
U.S. Appl. No. 10/894,491, filed Jul. 20, 2004, Method and System for Keeping a Fibre Channel Arbitrated Loop Open During Frame Gaps.
U.S. Appl. No. 10/894,536, filed Jul. 20, 2004, Method and System for Congestion Control Based on Optimum Bandwidth Allocation in a Fibre Channel Switch.
U.S. Appl. No. 10/894,627, filed Jul. 20, 2004, Method and System for Programmable Data Dependent Network Routing.
U.S. Appl. No. 10/719,077, filed Nov. 21, 2003, Method and System for Monitoring Events in Storage Area Networks.
U.S. Appl. No. 10/894,689, filed Jul. 20, 2004, Method and System for Power Control of Fibre Channel Switches.
U.S. Appl. No. 10/798,527, filed Mar. 11, 2004, Method and System for Preventing Deadlock in Fibre Channel Fabrics using Frame Priorities.
U.S. Appl. No. 10/798,468, filed Mar. 11, 2004, Method and System for Reducing Deadlock in Fibre Channel Fabrics using Virtual Lanes.
U.S. Appl. No. 10/894,586, filed Jul. 20, 2004, Method and System for Buffer to Buffer Credit recovery in Fibre Channel Systems Using Virtual and/or Pseudo Virtual Lane.
U.S. Appl. No. 10/889,635, filed Jul. 12, 2004, Method and System for Inexpensive and Non-Disruptive Data Capture in Networks.
U.S. Appl. No. 10/889,337, filed Jul. 12, 2004, Method and System for Minimizing Disruption in Common-Access Networks.
U.S. Appl. No. 10/889,259, filed Jul. 12, 2004, Method and Apparatus for Detecting and Removing Orphaned Primitives in a Fibre Channel Networks.
U.S. Appl. No. 10/889,267, filed Jul. 12, 2004, Method and System for Fibre Channel Arbitrated Loop Acceleration.
U.S. Appl. No. 10/889,551, filed Jul. 12, 2004, Method and Apparatus for Testing Loop Pathway Integrity in a Fibre Channel Arbitrated Loop.
U.S. Appl. No. 10/889,256, filed Jul. 12, 2004, Method and Apparatus for Accelerating Receive-Modify-Send Frames in a Fibre Channel Network.
U.S. Appl. No. 10/889,255, filed Jul. 12, 2004, Method and Apparatus for Test Pattern Generation.
U.S. Appl. No. 10/889,588, filed Jul. 12, 2004, Method and Apparatus for Improving Buffer Utilization in Communication Networks.
U.S. Appl. No. 10/894,978, filed Jul. 20, 2004, Method and System for Programmable Data Dependent.
U.S. Appl. No. 10/894,917, filed Jul. 20, 2004, Method and System for Configuring Fibre Channel Ports.
U.S. Appl. No. 10/894,529, filed Jul. 20, 2004, Integrated Fibre Channel Fabric Controller.
U.S. Appl. No. 10/894,732, filed Jul. 20, 2004, Method and System for Congestion Control in a Fibre Channel Switch.
U.S. Appl. No. 10/957,465, filed Oct. 1, 2004, Method and System for Using Boot Servers in Fibre Channel Network Routing.
U.S. Appl. No. 10/956,717, filed Oct. 1, 2004, Method and System for Transferring Data directly between storage devices in a Storage Area Networks.
U.S. Appl. No. 10/956,501, filed Oct. 1, 2004, High Speed Fibre Channel Switch Elements.
U.S. Appl. No. 10/956,502, filed Oct. 1, 2004, Method and System for LUN Remapping in Fibre Channel Networks.
U.S. Appl. No. 10/961,463, filed Oct. 8, 2004, Fibre Channel Transparent Switch for Mixed Switch Fabrics.
U.S. Appl. No. 1/956,718, filed Oct. 1, 2004, Method and System for Using an In-Line Credit Extender with a Host Bus Adapter.
"Final Office Action from USPTO dated Jul. 9, 2008 for U.S. Appl. No. 10/894,917".
"Notice of Allowance from USPTO dated Jul. 9, 2008 for U.S. Appl. No. 10/894,629".
"Notice of Allownce from USPTO dated Jul. 9, 2008 of U.S. Appl. No. 10/894,579".
"Notice of Allowance from USPTO dated Jul. 17, 2008 for U.S. Appl. No. 10/894,536".
"Office Action from USPTO dated Jul. 25, 2008 for U.S. Appl. No. 10/894,827".
"Office Action from State Intellectual Property Office (SIPO) of China for Chinese application 200580032889.0".
"Final Office Action from USPTO Dated Aug. 4, 2008 for U.S. Appl. No. 10/894,732".
"Notice of Allowance from USPTO dated Aug. 18, 2008 for U.S. Appl. No. 10/889,259".
"Final Office Action from USPTO dated Aug. 20, 2008 for U.S. Appl. No. 10/798,468".
"Final Office Action from USPTO dated Jun. 10, 2008 for U.S. Appl. No. 10/894,586".
"Office Action from USPTO dated Jun. 25, 2008 for U.S. Appl. No. 10/895,175".
"Notice of Allowance from USPTO dated Jun. 25, 2008 for U.S. Appl. No. 10/894,491".
"Notice of Allownce from USPTO dated Jun. 27, 2008 for U.S. Appl. No. 10/956,717".
"Office Action from USPTO dated Jun. 27, 2008 for U.S. Appl. No. 10/894,726".
"Office Action from USPTO dated Sep. 18, 2008 for U.S. Appl. No. 10/894,978".
"Office Action from USPTO dated Sep. 23, 2008 for U.S. Appl. No. 12/031,585".
"Project-T11/1619-D/Rev. 0.50", *Information technology Industry Council, Fibre Channel: Framing and Signaling-2*, Dec. 2004, Rev. 0.50, 76, 81, 114, 115.
"Notice of Allowance from the USPTO dated Sep. 29, 2008 for U.S. Appl. No. 10/889,267".
"Office Action from USPTO dated Sep. 29, 2008 for U.S. Appl. No. 11/363,365".
"Final Office Action from USPTO dated Oct. 8, 2008 for U.S. Appl. No. 11/057,912".
"Non-Final Office Action from USPTO dated Oct. 10, 2008 for U.S. Appl. No. 10/894,627".
"Notice of Allowance from USPTO dated Oct. 8, 2008 for U.S. Appl. No. 10/889,255".
"Notice of Allowance from USPTO dated Oct. 8, 2008 for U.S. Appl. No. 10/798,527".
"Notice of Allowance from USPTO dated Oct. 15, 2008 for U.S. Appl. No. 10/894,492".
"Final Office Action from USPTO dated Oct. 17, 2008 for U.S. Appl. No. 10/894,595".
"Final Office Action from USPTO dated Nov. 13, 2008 for U.S. Appl. No. 10/894,587".
"Office Action from USPTO dated Nov. 13, 2008 for U.S. Appl. No. 10/894,917".

"Office Action from USPTO dated Nov. 26, 2008 for U.S. Appl. No. 10/956,502".

"Final Office Action from USPTO dated Dec. 24, 2008 for U.S. Appl. No. 10/894,726".

"Office Action from USPTO dated Dec. 23, 2008 for U.S. Appl. No. 10/798,468".

"Notice of Allowance from USPTO dated Dec. 30, 2008 for U.S. Appl. No. 11/037,922".

"Final Office Action from USPTO dated Jan. 21, 2009 for U.S. Appl. No. 10/894,827".

"Office Action from USPTO dated Jan. 17, 2009 for U.S. Appl. No. 10/894,586".

"Final Office Action from USPTO dated Jan. 26, 2009 for U.S. Appl. No. 10/895,175".

"Notice of Allowance from USPTO dated Feb. 10, 2009 for U.S. Appl. No. 10/894,595".

"Office Action from USPTO dated Feb. 17, 2009 for U.S. Appl. No. 10/894,732".

"Notice of Allowance from USPTO dated May 5, 2009 for U.S. Appl. No. 10/798,468".

"Office Action from USPTO dated May 14, 2009 for U.S. Appl. No. 11/682,199".

"Notice of Allowance from USPTO dated May 18, 2009 for U.S. Appl. No. 10/894,917".

"Notice of Allowance from USPTO dated May 26, 2009 for U.S. Appl. No. 10/894,627".

"Notice of Allowance from USPTO dated Feb. 25, 2009 for U.S. Appl. No. 10/894,827".

"Notice of Allowance from USPTO dated Feb. 27, 2009 for U.S. Appl. No. 10/895,175".

"Notice of Allowance from USPTO dated Mar. 6, 2009 for U.S. Appl. No. 10/956,502".

"Office Action from USPTO dated Mar. 9, 2009 for U.S. Appl. No. 11/057,912".

"Notice of Allowance from USPTO dated Mar. 9, 2009 for U.S. Appl. No. 10/889,635".

"Office Action from USPTO dated Mar. 16, 2009 for U.S. Appl. No. 10/956,501".

"Notice of Allowance from USPTO dated Mar. 20, 2009 for U.S. Appl. No. 10/894,978".

"Notice of Allowance from USPTO dated Mar. 23, 2009 for U.S. Appl. No. 12/198,644".

"Office Action from USPTO dated Mar. 25, 2009 for U.S. Appl. No. 10/894,546".

"Notice of Allowance from USPTO dated Mar. 31, 2009 for U.S. Appl. No. 12/031,585".

"Office Action from USPTO dated Apr. 2, 2009 for U.S. Appl. No. 10/889,256".

"Examination Report from European Patent Office dated Mar. 27, 2009 for European Application No. 05798761.2".

"Notice of Allowance from USPTO dated Apr. 27, 2009 for U.S. Appl. No. 11/363,365".

"Notice of Allowance from USPTO dated Jul. 6, 2009 for U.S. Appl. No. 10/894,587".

"Notice of Allowance from USPTO dated Jul. 9, 2009 for U.S. Appl. No. 10/894,726".

"Office Action from USPTO dated Jul. 23, 2009 for U.S. Appl. No. 10/894,732".

"Office Action from USPTO dated Sep. 8, 2009 for U.S. Appl. No. 11/743,852".

"Final Office Action from USPTO dated Sep. 15, 2009 for U.S. Appl. No. 10/956,501".

"Office Action from USPTO dated Sep. 25, 2009 for U.S. Appl. No. 11/682,199".

"Final Office Action from USPTO dated Oct. 26, 2009 for U.S. Appl. No. 10/894,546".

"Notice of Allowance from USPTO dated Nov. 2, 2009 for U.S. Appl. No. 12/189,497".

"Final Office Action from USPTO dated Nov. 10, 2009 for U.S. Appl. No. 11/057,912".

"Office Action from USPTO dated Dec. 2, 2009 for U.S. Appl. No. 12/141,519".

"Office Action from USPTO dated Jan. 6, 2010 for U.S. Appl. No. 10/956,501",.

"Office Action from USTPO dated Jan. 26, 2010 for U.S. Appl. No. 10/956,501",.

* cited by examiner

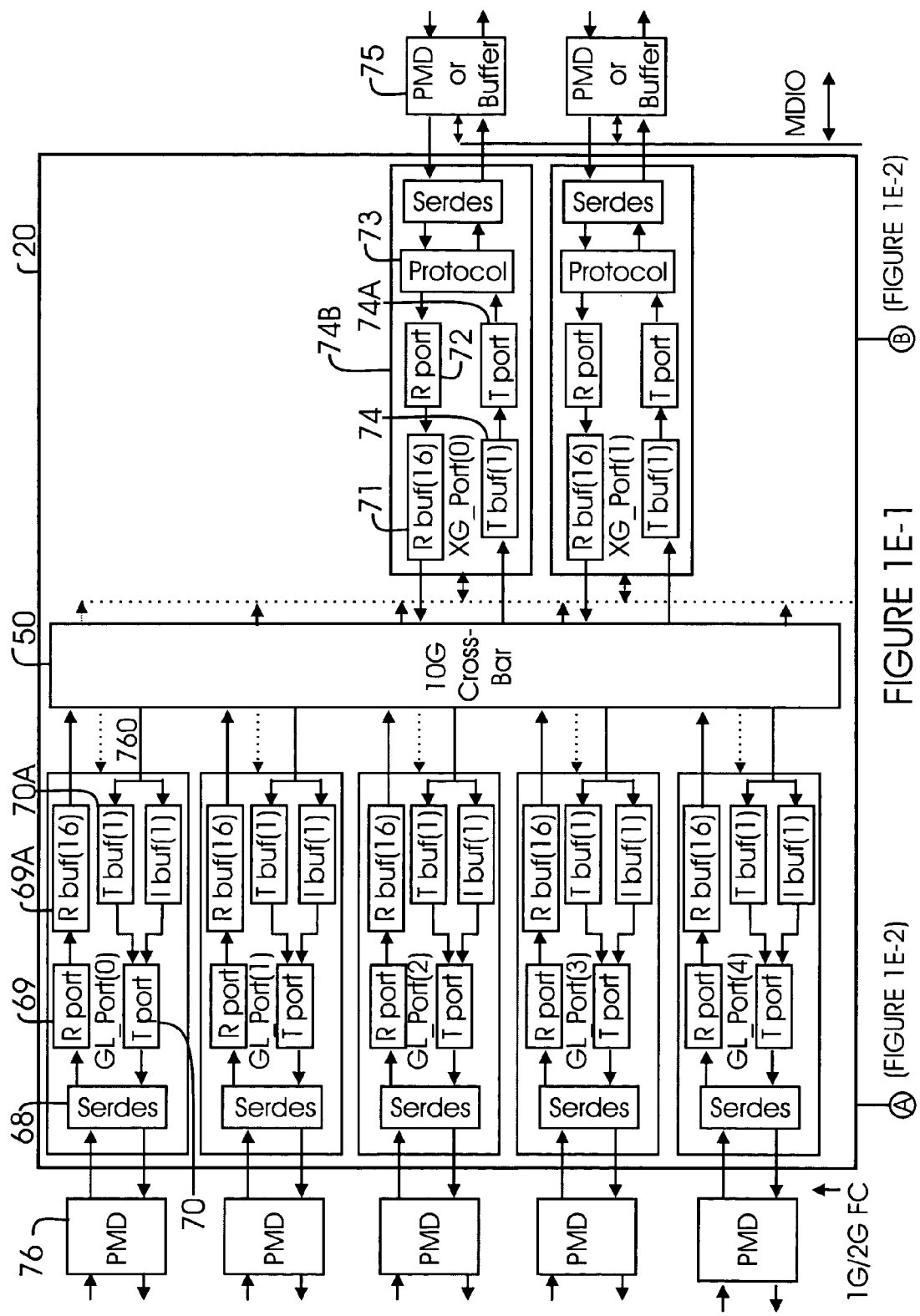

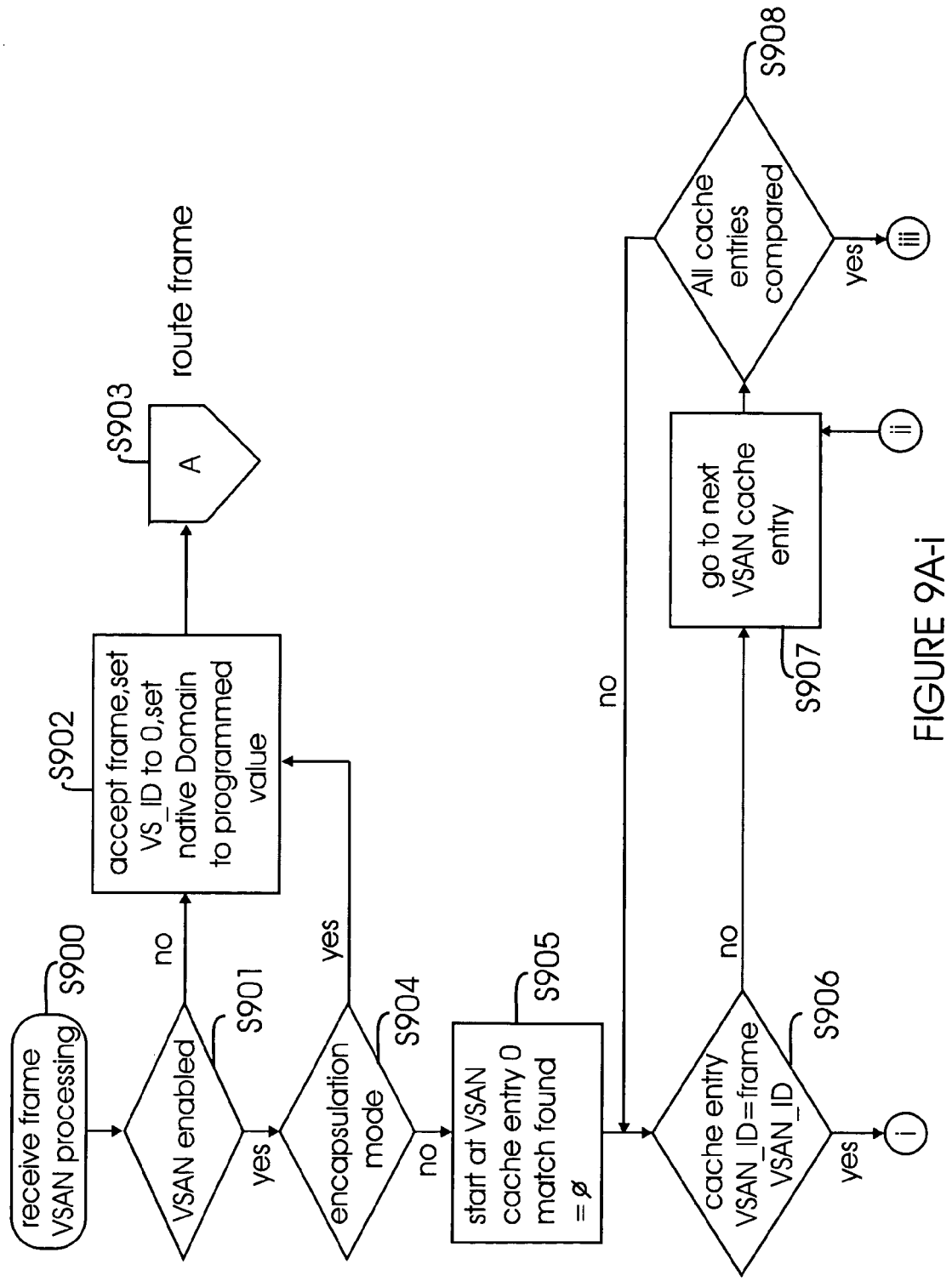
FIGURE 9A-i

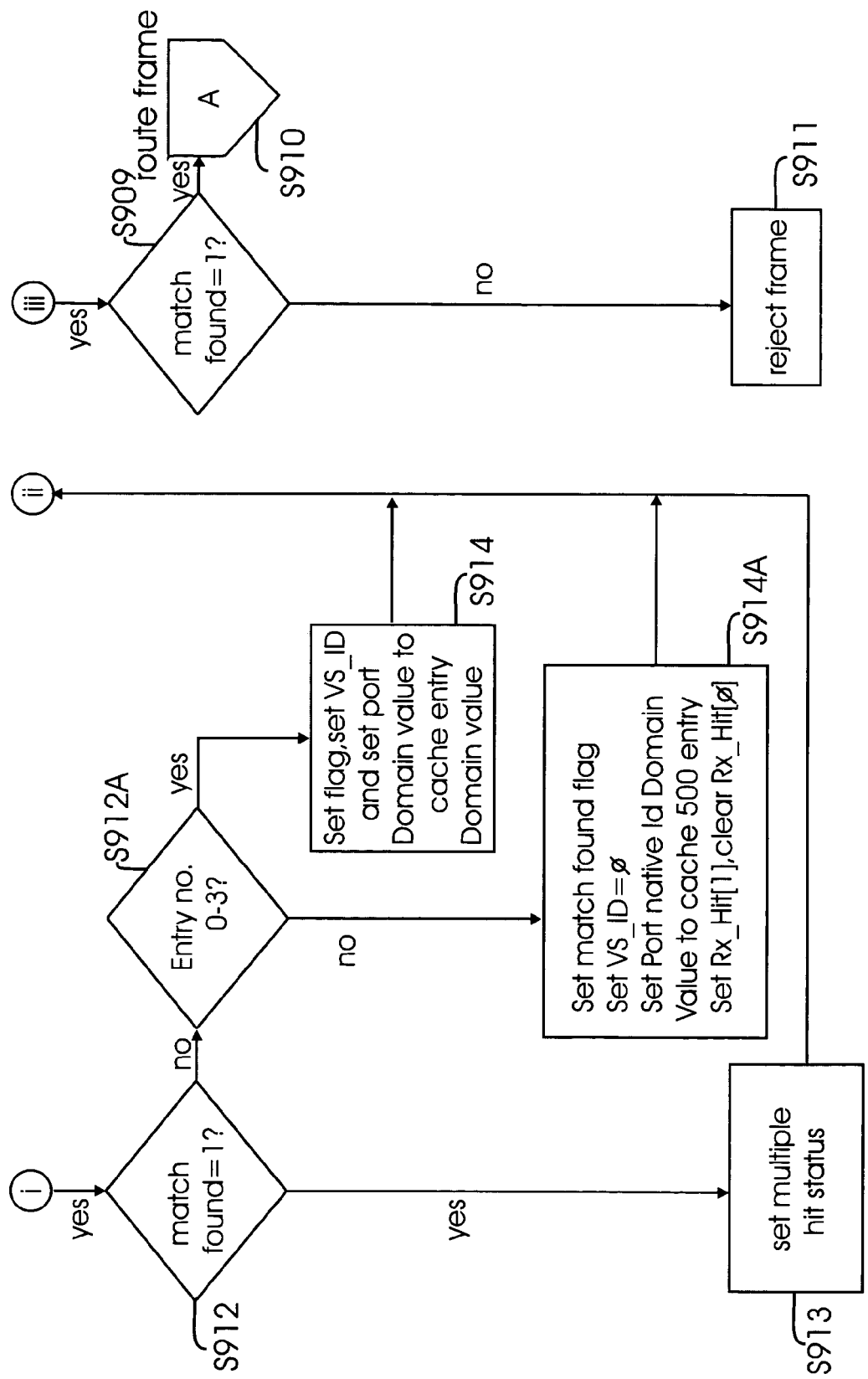
FIGURE 9A-ii

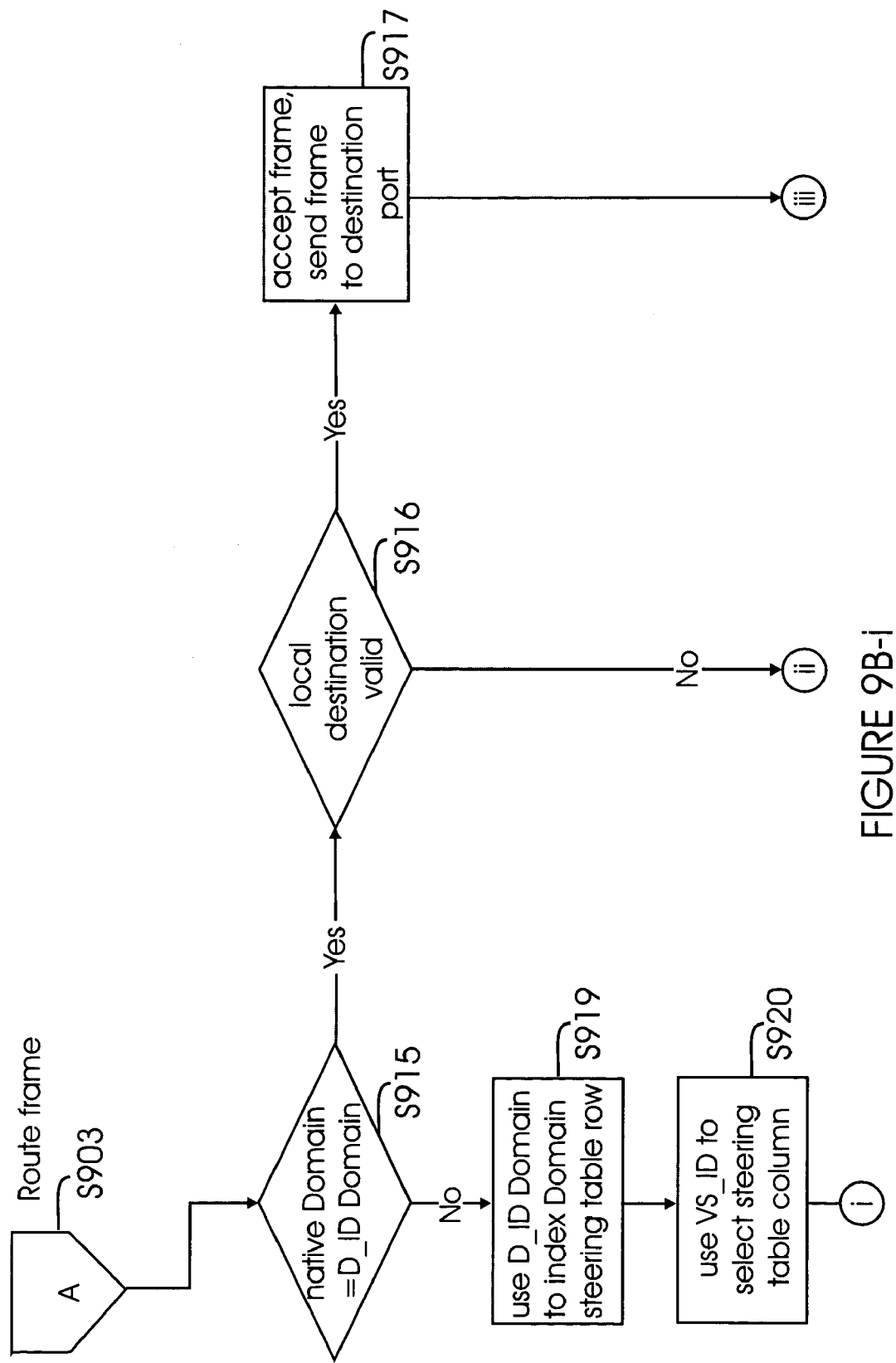
FIGURE 9B-i

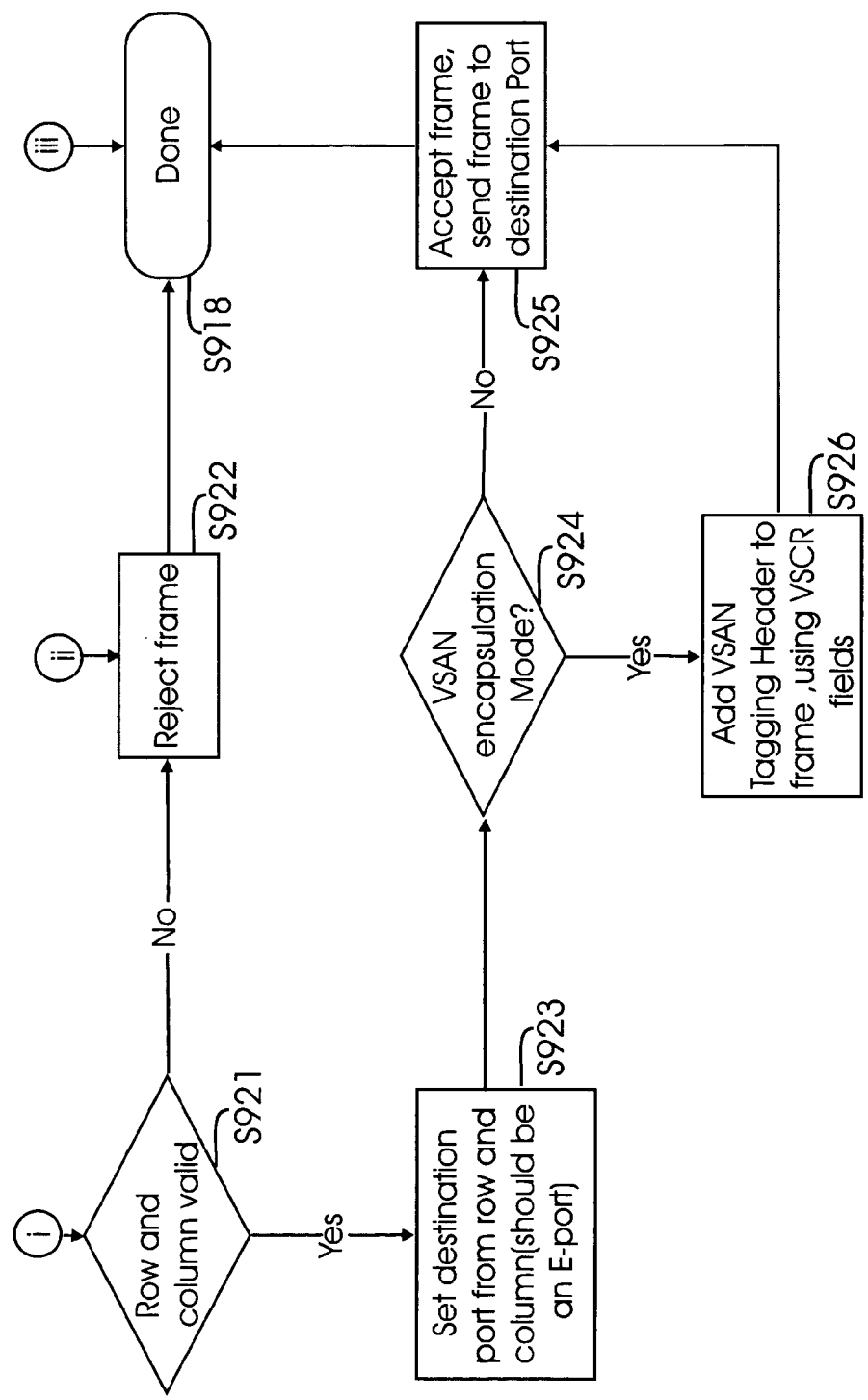
FIGURE 9B-ii

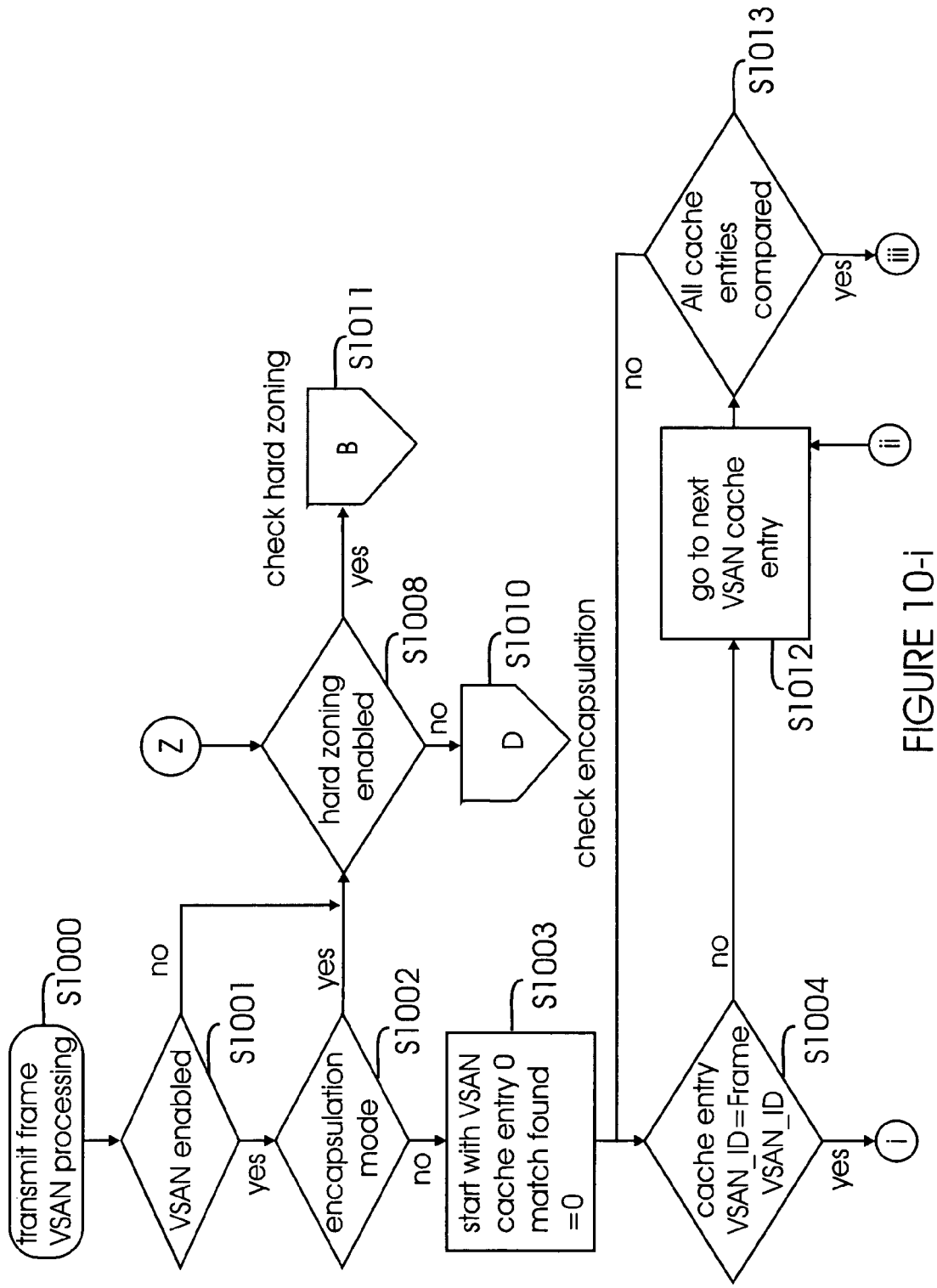
FIGURE 10-i

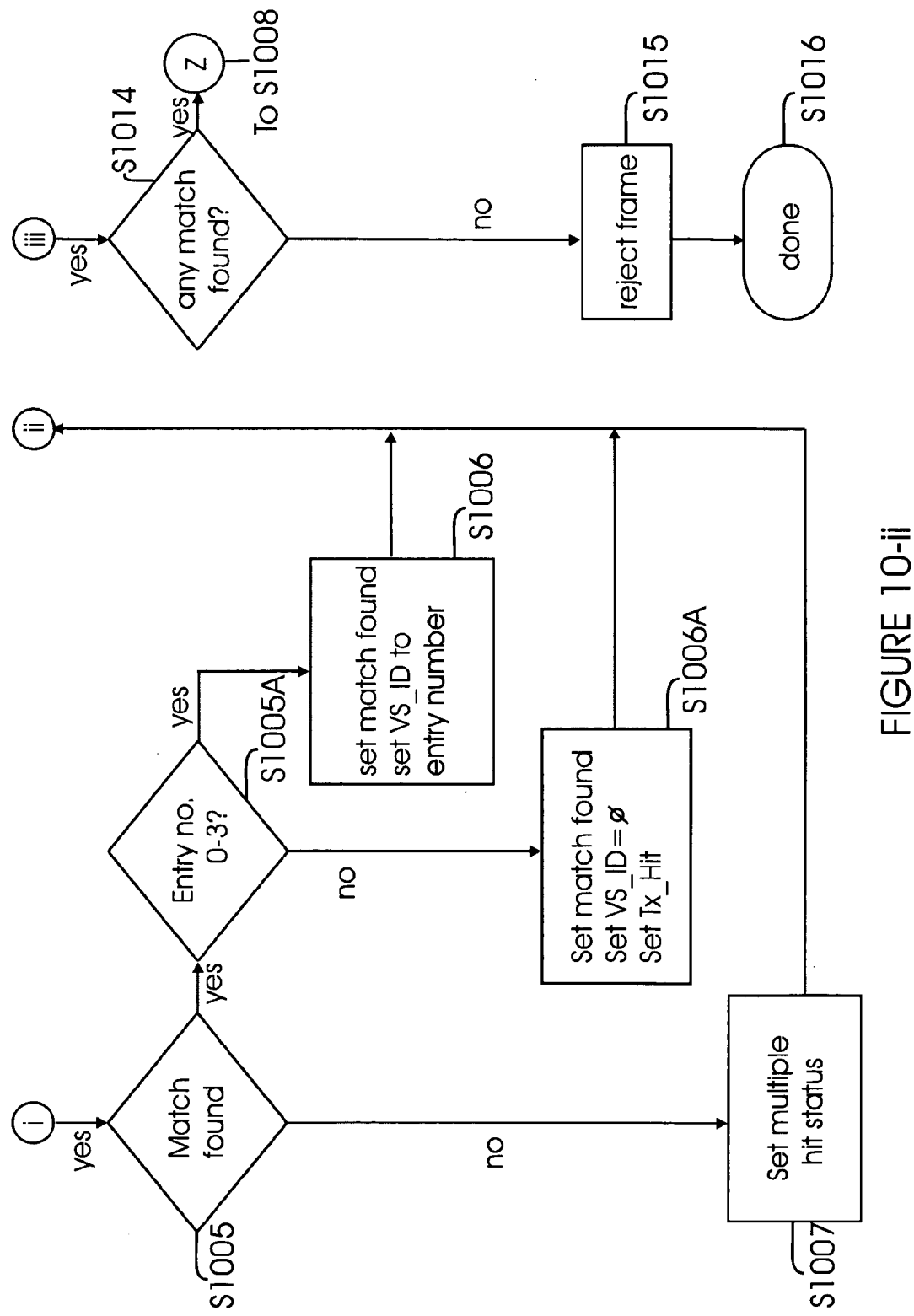
FIGURE 10-ii

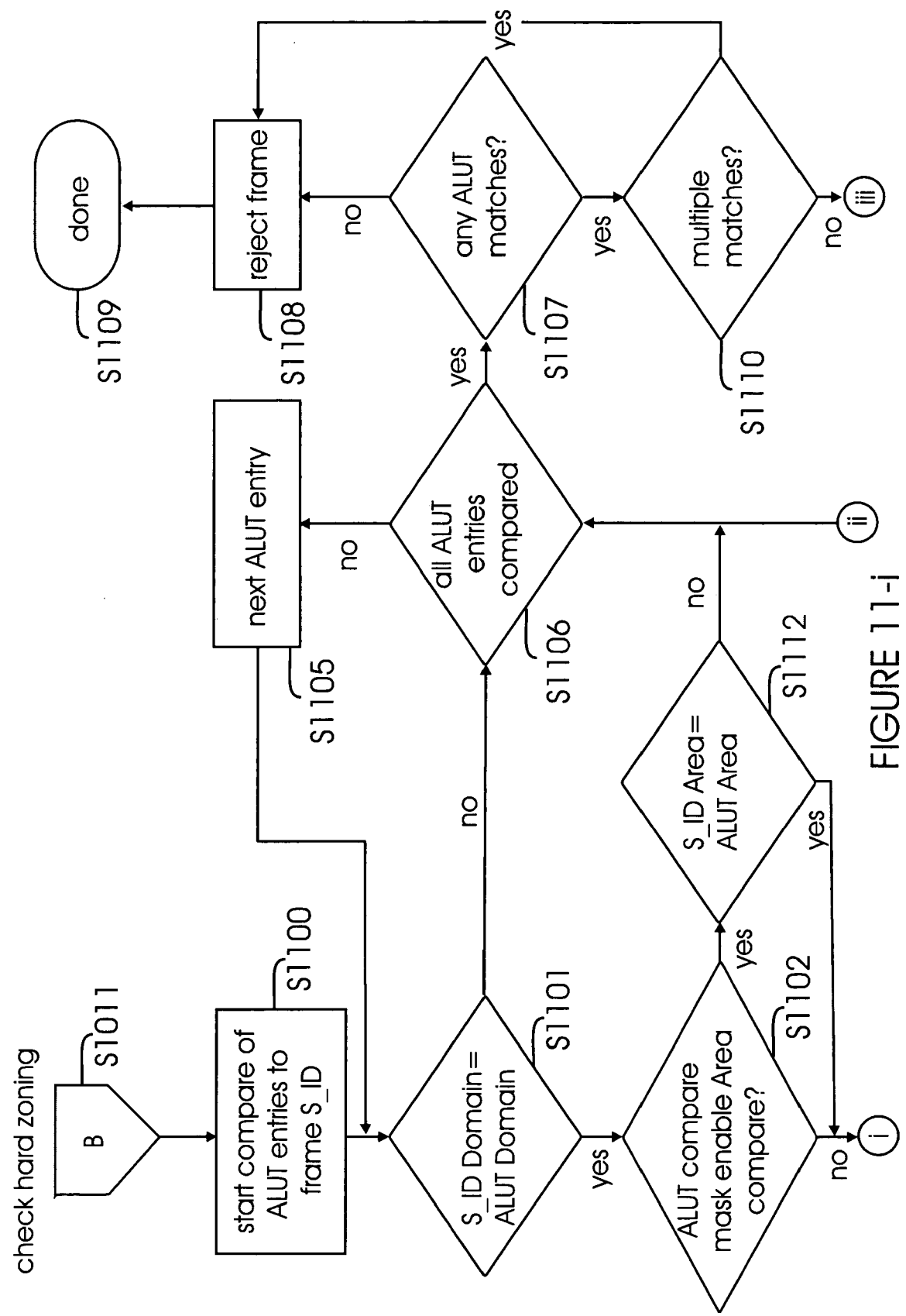
FIGURE 11-i

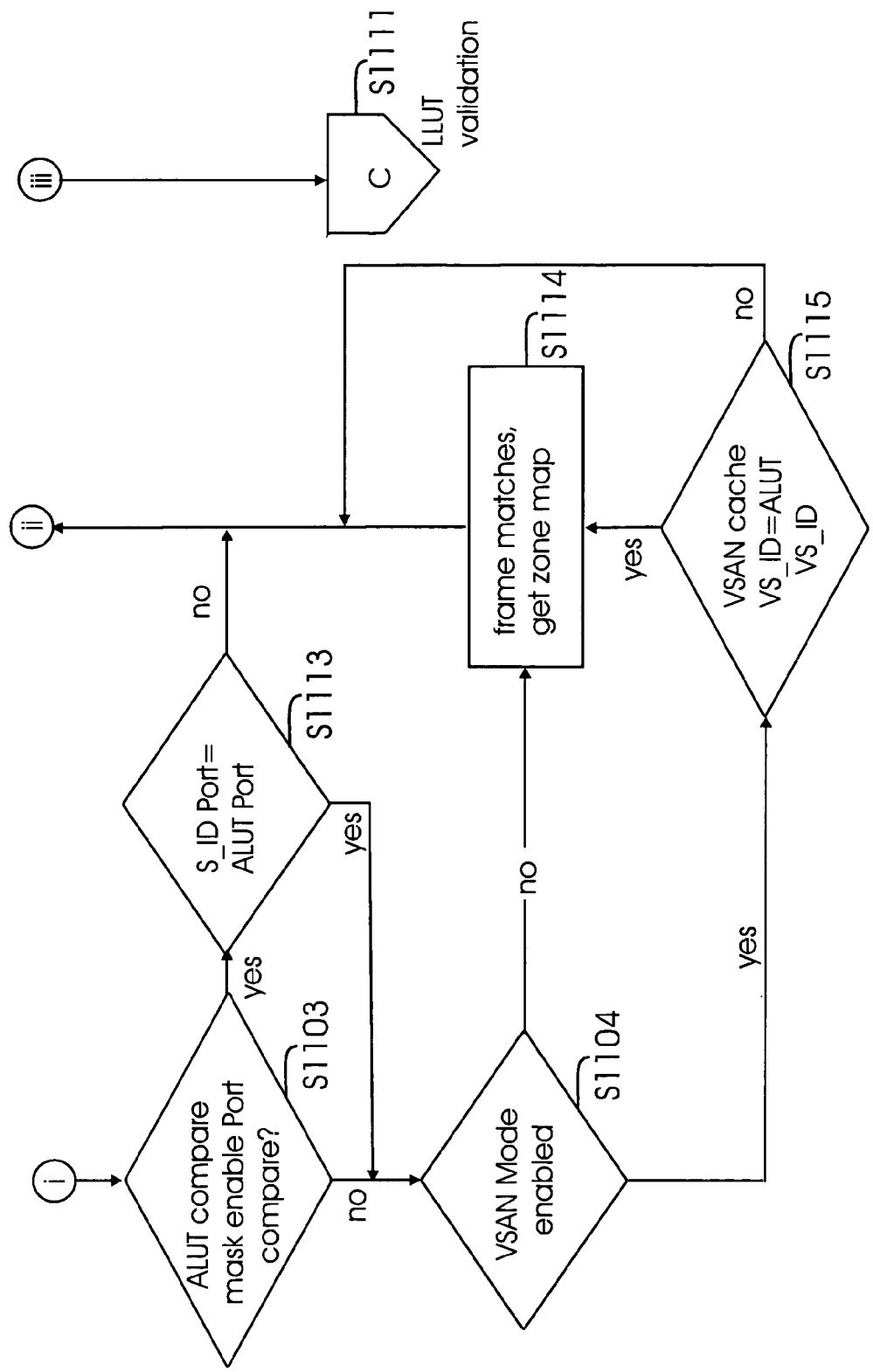
FIGURE 11-ii

METHOD AND SYSTEM FOR USING EXTENDED FABRIC FEATURES WITH FIBRE CHANNEL SWITCH ELEMENTS

CROSS REFERENCE TO RELATED APPLICATIONS

This application claims priority under 35 U.S.C. §119(e)(1) to the following provisional patent applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network Data Packets In Fibre Channel Systems";

Filed on Jul. 21, 2003, Ser. No. 60/488,757, entitled "Method and System for Selecting Virtual Lanes in Fibre Channel Switches";

Filed on Dec. 29, 2003, Ser. No. 60/532,965, entitled "Programmable Pseudo Virtual Lanes for Fibre Channel Systems";

Filed on Sep. 19, 2003, Ser. No. 60/504,038, entitled" Method and System for Reducing Latency and Congestion in Fibre Channel Switches;

Filed on Aug. 14, 2003, Ser. No. 60/495,212, entitled "Method and System for Detecting Congestion and Over Subscription in a Fibre channel Network";

Filed on Aug. 14, 2003, Ser. No. 60/495, 165, entitled "LUN Based Hard Zoning in Fibre Channel Switches";

Filed on Sep. 19, 2003, Ser. No. 60/503,809, entitled "Multi Speed Cut Through Operation in Fibre Channel Switches";

Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane";

Filed on Dec. 29, 2003, Ser. No. 60/532,966, entitled "Method And System For Using Extended Fabric Features With Fibre Channel Switch Elements";

Filed on Mar. 4, 2004, Ser. No. 60/550,250, entitled "Method And System for Programmable Data Dependent Network Routing";

Filed on May 7, 2004, Ser. No. 60/569,436, entitled "Method And System For Congestion Control In A Fibre Channel Switch";

Filed on May 18, 2004, Ser. No. 60/572,197, entitled "Method and System for Configuring Fibre Channel Ports" and Filed on Dec. 29, 2003, Ser. No. 60/532,963 entitled "Method and System for Managing Traffic in Fibre Channel Switches".

The disclosure of the foregoing applications is incorporated herein by reference in their entirety.

BACKGROUND

1. Field of the Invention

The present invention relates to fibre channel systems, and more particularly, to extending physical fibre channel fabric capabilities using virtual fabrics.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop.

The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames that a buffer can hold per fabric port.

Current fibre channel standards only allow 239 switches using a 24-bit addressing scheme. This can be limiting as networks grow in size and complexity.

One proposal has been to use virtual fabrics (also known as Virtual Storage Area Network ("VSAN") that will allow a physical fibre channel fabric to be extended beyond the current 239-switch limitation.

Virtual fabrics divide a physical fabric into multiple virtual fabrics. Each virtual fabric has its own switch domain Id, N_Port logins, fabric routing and fabric services (for example, name servers). A port may be a part of more than one virtual fabric.

Although use of virtual fabrics is useful, conventional fibre channel switch elements are not designed to handle various issues that arise using the virtual fabrics, for example, hard zoning and fibre channel extension methods.

Therefore, what is required is a fibre channel switch element that can extend the capabilities of a fabric by using virtual fabrics.

SUMMARY OF THE PRESENT INVENTION

In one aspect of the present invention, a fibre channel frame format is used for routing fibre channel frames is provided. The format includes, a tagging header with a virtual storage area network identifier ("VSAN_ID") field that specifies a virtual storage area network ("VSAN") and a R_CTL field that is set to a certain value to indicate that the tagging header includes a VSAN value.

In another aspect of the present invention, a fibre channel switch element for routing fibre channel frames is provided. The switch element includes a receive segment that can add a virtual storage area network ("VSAN") tagging header to frames that are received by the receive segment; and strip the VSAN tagging header before frames are sent to ports that do not support virtual fabric capability. The receive segment includes a table used for matching fabric extension parameters. A control bit is used to enable support for VSAN at a particular port and a bit is used enable encapsulation mode for a switch element port.

An incoming frame's VSAN identity value is compared to a control word entry to generate a value used for routing the incoming frame. The table is used to determine if a frame is part of a virtual fabric. The routing table for each port is used to route frames and the routing table includes entries for supported virtual fabrics.

In one aspect of the present invention, a method for routing fibre channel frames at a receive segment of a fibre channel switch element is provided. The method includes, determining if support for virtual storage area network ("VSAN") capability is enabled; comparing incoming frames VSAN identifier with plural entries stored in a cache table if encapsulation mode is not set; and routing incoming frames based on the comparison. An error message is generated if the comparison produces a multiple match.

In another aspect of the present invention, a method for routing fibre channel frames at a transmit segment of a fibre channel switch element is provided. The method includes determining if a virtual storage area network ("VSAN") support and encapsulation mode is enabled; and comparing frame VSAN identifier entry values with a cache table entry values and setting up a multiple hit status if more than one entry matches the frame VSAN identifier.

If encapsulation mode is set then the process determines if hard zoning is enabled. A frame's parameters are compared to a look up table entries and if there is no match, the frame is rejected. A frame's S_ID is compared to the look table entries. A frames S_ID Area value is compared to look up table entries and if there is a match then a frames S_ID port value is compared to look up table port entry values, if a look table compare mask is enabled.

In yet another aspect of the present invention, a fibre channel switch element is used for routing fibre channel frames is provided. The switch element includes a common segment that includes a look up table that is indexed by port values of a frame's D_ID and a bit map to compare a zone mask of a matching entry generated by a virtual storage area network ("VSAN") cache. Lower 8 bits of D_ID are used to index the look up table.

If the VSAN cache entry is used to select a column from the look up table, a logical comparison is performed between a zone map and look up table entries. If there is no match after the comparison and encapsulation mode is enabled, then a tagging header is stripped from a frame before the frame is transmitted.

In yet another aspect of the present invention, a fibre channel switch element for routing fibre channel frames is provided. The switch element includes, a domain table at each port for routing fibre channel frames, wherein a column is selected to route frames based on a virtual storage area network ("VSAN") identifier that is generated from a VSAN cache.

If a domain identifier is not assigned for a virtual fabric, then a frame for the virtual fabric is rejected. Also, a control register is used to control domain table column selection for routing fibre channel frames.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 9A-i/9A-ii (referred to as FIG. 9A) shows a flow diagram for processing fibre channel frames received at a receive segment of a fibre channel port, according to one aspect of the present invention;

FIGS. 9B-i/9B-ii (referred to as FIG. 9B) shows a flow diagram for routing fibre channel frames, according to one aspect of the present invention;

FIGS. 10-i/10-ii (collectively referred to as FIG. 10) shows a flow diagram for transmitting frames with the VSAN feature, according to one aspect of the present invention;

FIGS. 11-i/11-ii (collectively referred to as FIG. 11) shows a flow diagram for hard zoning involving VSANs, according to one aspect of the present invention.

DETAILED DESCRIPTION OF THE PREFERRED EMBODIMENTS

Figure 1A:
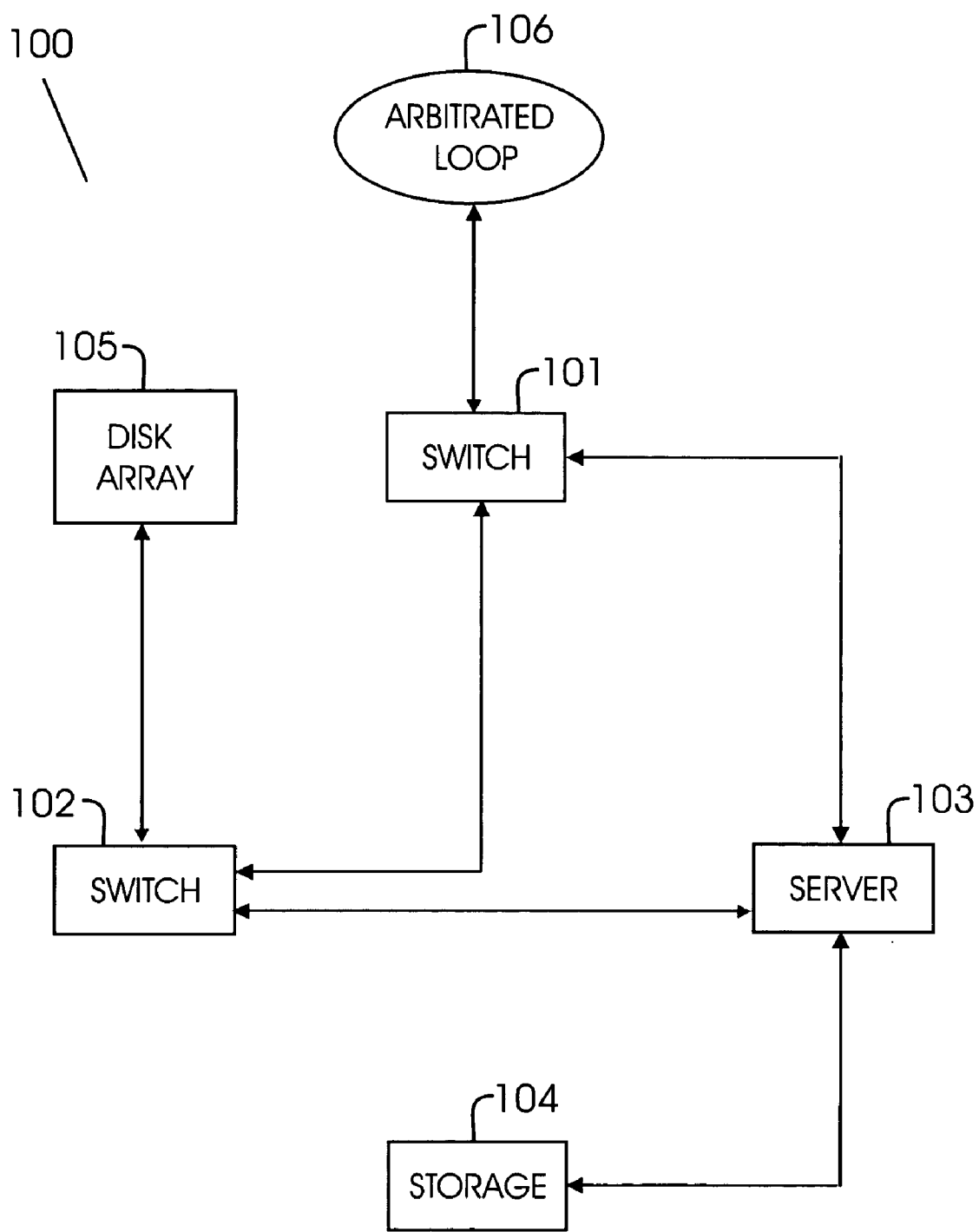
FIG. 1A shows an example of a Fibre Channel network system.

Definitions:

The following definitions are provided as they are typically (but not exclusively) used in the fibre channel environment, implementing the various adaptive aspects of the present invention.

"D_ID": 24-bit fibre channel header field that contains destination address.

"Domain_Id": The high 8 bits of a 24-bit fibre channel address that identifies a switch within a fabric.

"EOF": End of Frame

"E_Port": A fabric expansion port that attaches to another Interconnect port to create an Inter-Switch Link.

"Encapsulation Mode": Fibre channel switch port mode that is used when a switch connected to a device does not support VSANs. During this mode the switch adds a VSAN Tagging Header to all incoming frames and strips off the VSAN Tagging Header from all transmitted frames.

"F_Port": A port to which non-loop N_Ports are attached to a fabric and does not include FL_ports.

"Fibre channel ANSI Standard": The standard, incorporated herein by reference in its entirety, describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"FC-FS": Fibre channel standard, incorporated herein by reference in its entirety, for framing and signaling, including frame structure, basic link maintenance and login, and sequence and exchange operation, incorporated herein by reference in its entirety.

"FC-GS-3": Fibre channel specification incorporated herein by reference in its entirety for fabric servers and includes zoning.

"Fabric": The structure or organization of a group of switches, target and host devices (NL_Port, N_ports etc.).

"Fabric Topology": This is a topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one or more NL_Ports in an Arbitrated Loop topology.

"Hard Zoning": This restricts access to certain ports by filtering frames.

"Inter-Switch Link": A Link directly connecting the E_port of one switch to the E_port of another switch.

"Port": A general reference to N. Sub.—Port or F.Sub.-_Port.

"L_Port": A port that contains Arbitrated Loop functions associated with the Arbitrated Loop topology.

"N_Port": A direct fabric attached port.

"NL_Port": A L_Port that can perform the function of a N_Port.

"R_CTL": 8-bit fibre channel frame header field that identifies the type of frame.

"S_ID": 24-bit fibre channel header field that contains the source address of a frame.

"SOF": Start of Frame

"Tagging Header": A special 2-word header at the start of a fibre channel frame used to identify and route frames on a VSAN.

"TE_Port": An E_Port that supports VSANs.

"TF_Port": An F_Port that supports VSANs.

"TN_Port": An N_port that supports VSANs.

"Switch": A fabric element conforming to the Fibre Channel Switch standards.

"Virtual Fabric" (may also be referred to as "VSAN"): A subset of a physical fibre channel fabric that acts as an independent fabric with its own addressing and services scheme.

"VSAN_ID": A number that identifies a particular virtual fabric.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 1B:
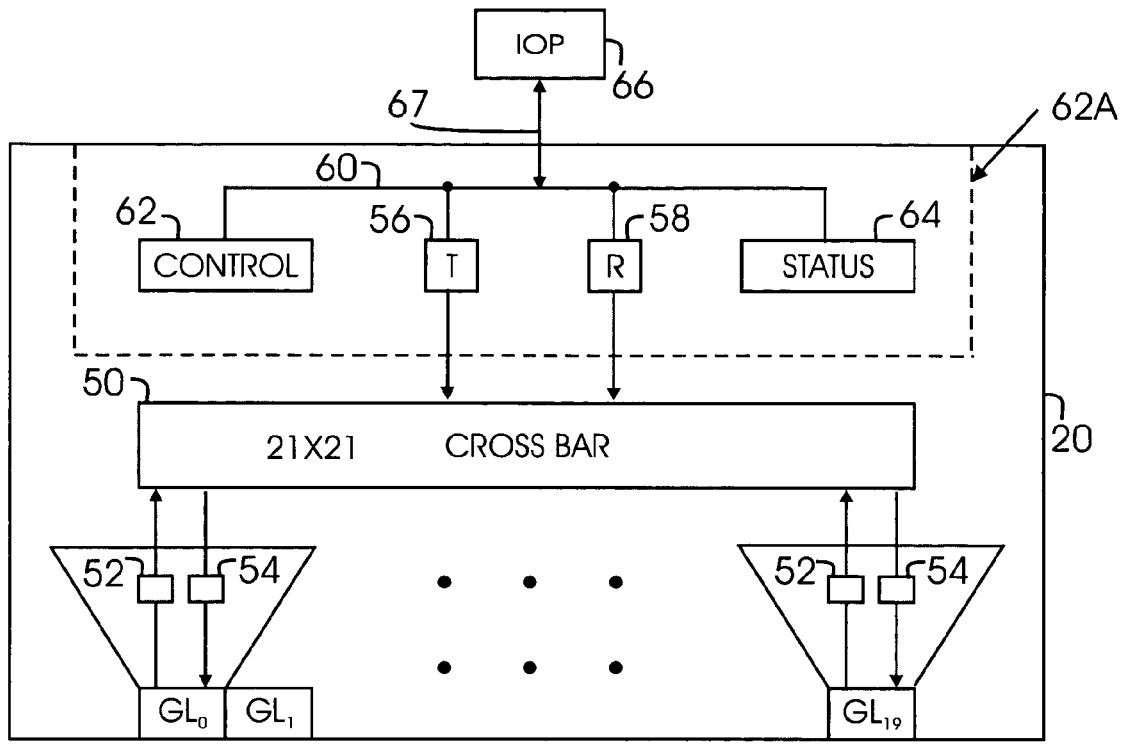
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
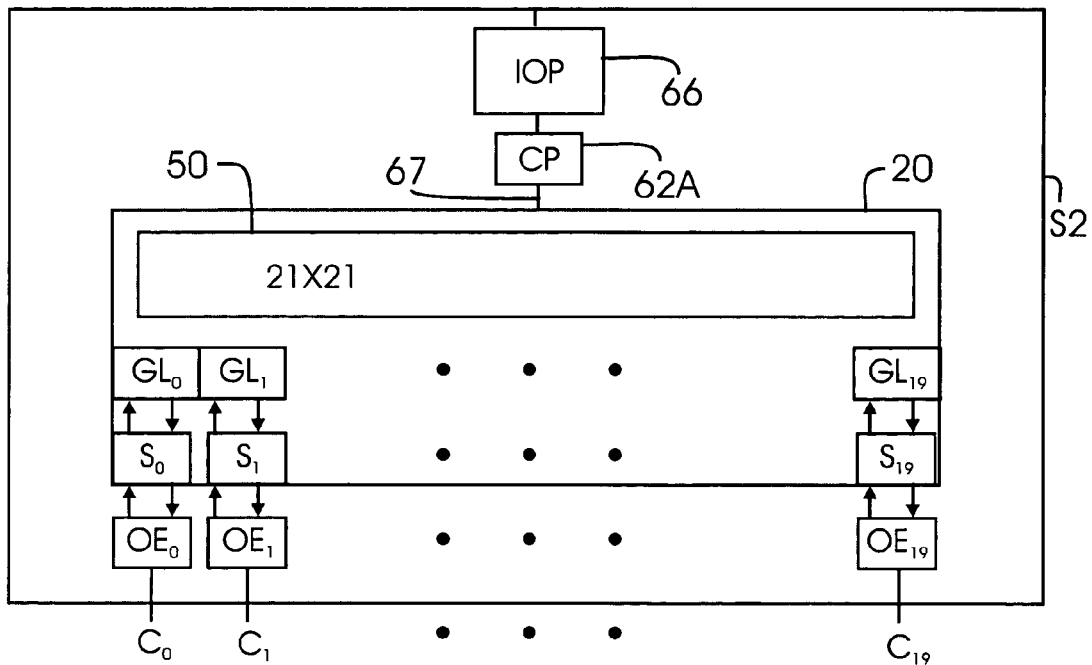
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL ports correspond to channel C0-C19. Each GL port has a serial/deserializer (SERDES) designated as S0-S19. Ideally, the SERDES functions are implemented on ASIC 20 for efficiency, but may alternatively be external to each GL port.

Each GL port has an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
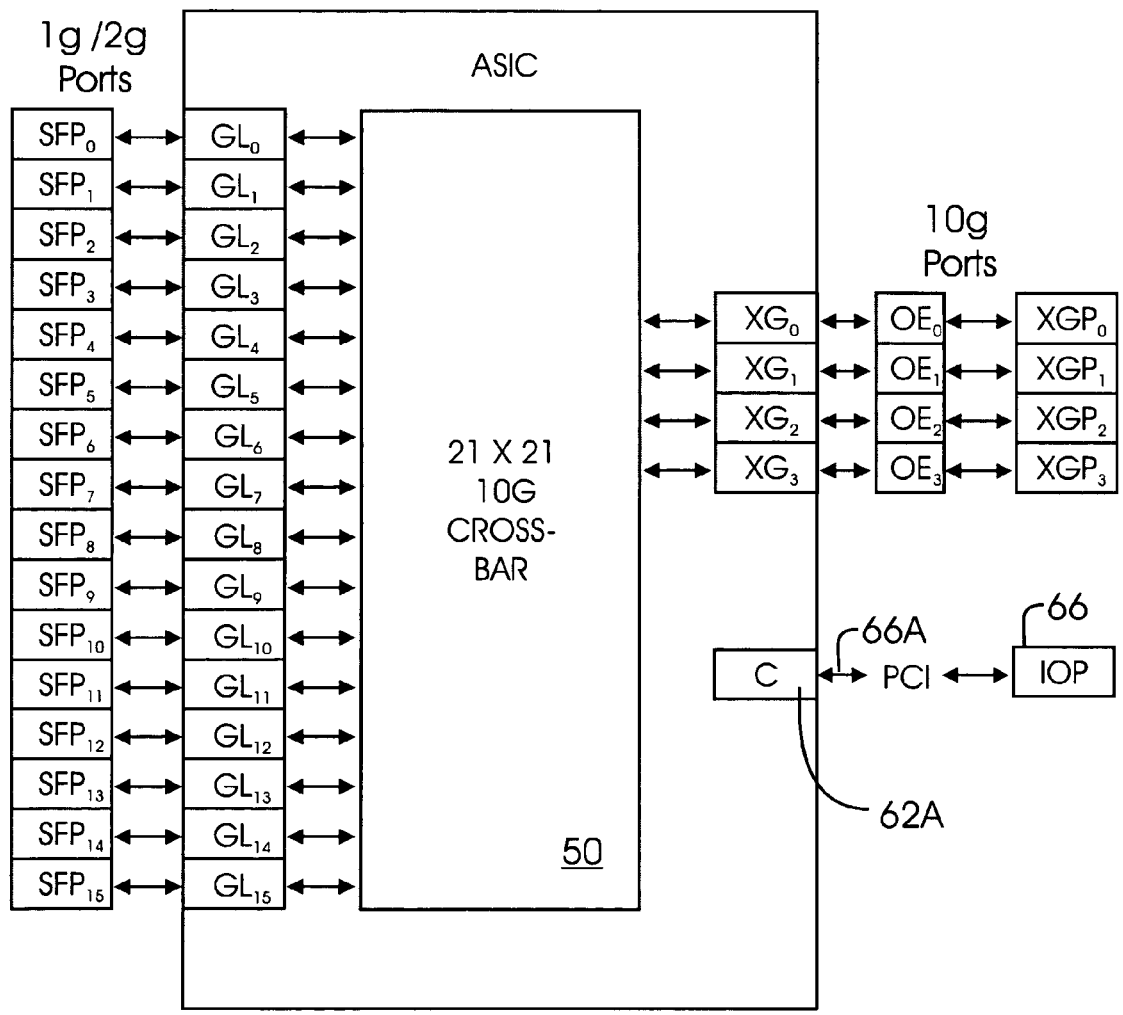
FIG. 1D shows a block diagram of a Fibre Channel switch element with sixteen GL_Ports and four 10G ports, according to one aspect of the present invention.

FIG. 1D shows a block diagram of ASIC 20 with sixteen GL ports and four 10G (Gigabyte) port control modules designated as XG0-XG3 for four 10G ports designated as XGP0-XGP3. ASIC 20 include a control port 62A that is coupled to IOP 66 through a PCI connection 66A.

Figures 1, 1E, 2:
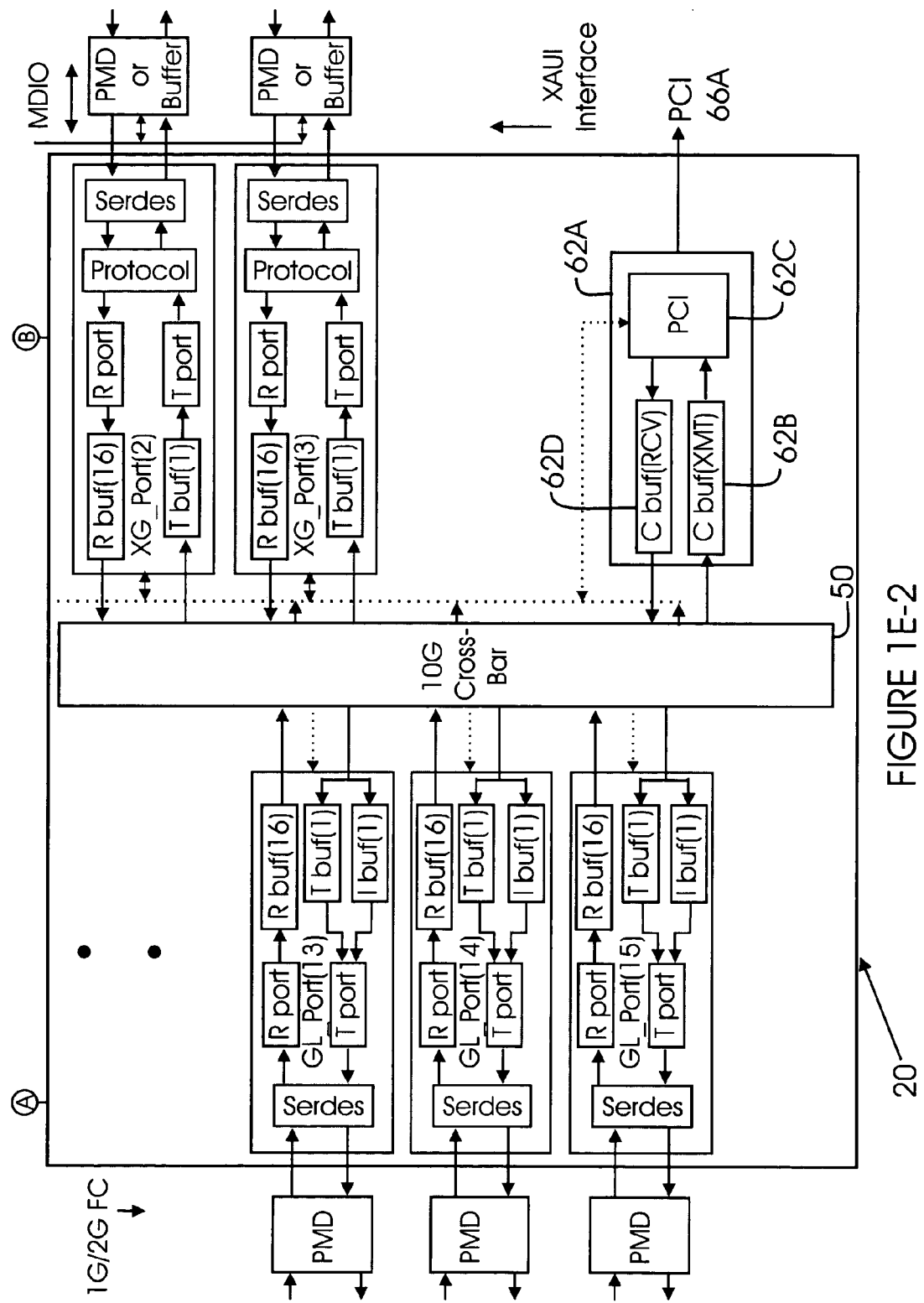
FIGS. 1E-1/1E-2 (jointly referred to as FIG. 1E) show another block diagram of a Fibre Channel switch element with sixteen GL_Ports and four 10G ports, according to one aspect of the present invention.

FIG. 1E-1/1E-2 (jointly referred to as FIG. 1E) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

Figure 3A:
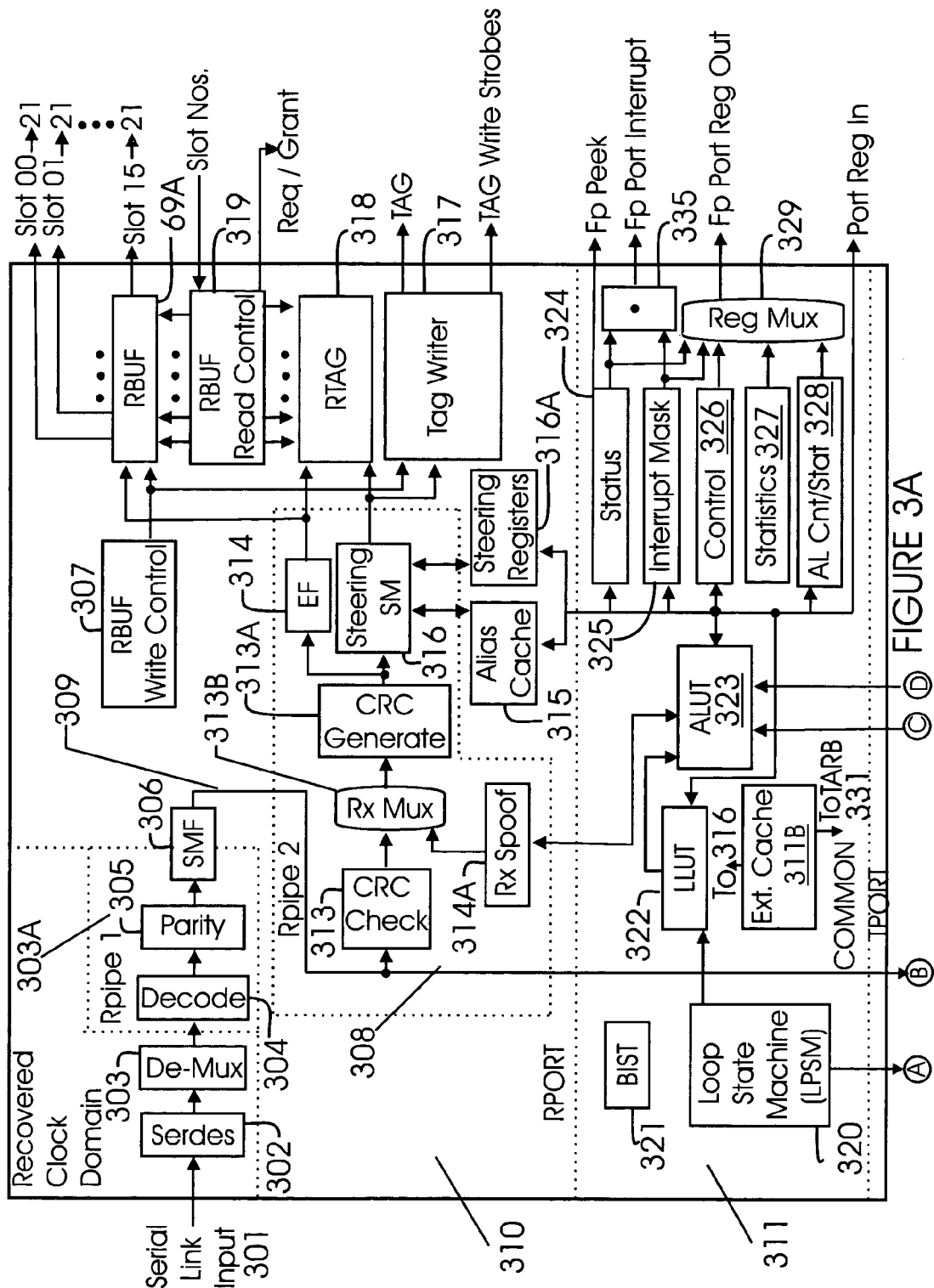
FIGS. 3A/3B (jointly referred to as FIG. 3) show a block diagram of a GL_Port, according to one aspect of the present invention.
Figure 3B:
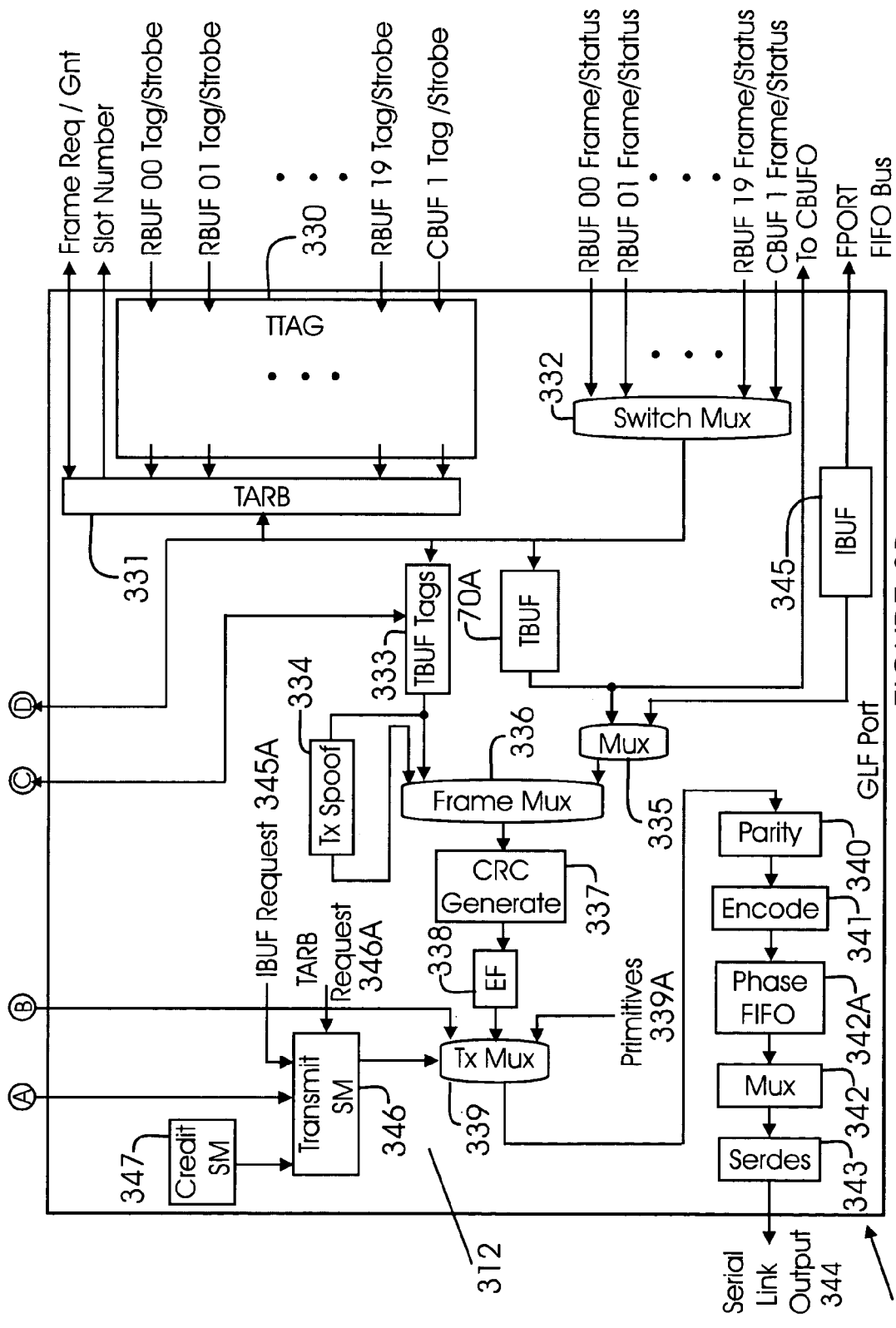

GL Port:

FIGS. 3A-3B (referred to as FIG. 3) show a detailed block diagram of a GL port as used in ASIC 20. GL port 300 is shown in three segments, namely, receive segment (RPORT) 310, transmit segment (TPORT) 312 and common segment 311.

Receive Segment of GL Port:

Frames enter through link 301 and SERDES 302 converts data into 10-bit parallel data to fibre channel characters, which are then sent to receive pipe ("Rpipe" (may also be referred to as "Rpipe1" or "Rpipe2")) 303A via a de-multiplexer (DEMUX) 303. Rpipe 303A includes, parity module 305 and decoder 304. Decoder 304 decodes 10B data to 8B and parity module 305 adds a parity bit. Rpipe 303A also performs various Fibre Channel standard functions such as detecting a start of frame (SOF), end-of frame (EOF), Idles, R_RDYs (fibre channel standard primitive) and the like, which are not described since they are standard functions.

Rpipe 303A connects to smoothing FIFO (SMF) module 306 that performs smoothing functions to accommodate clock frequency variations between remote transmitting and local receiving devices.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter GL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 69A are controlled by RBUF read control logic ("RRD") 319 and RBUF write control logic ("RWT") 307, respectively. RWT 307 specifies which empty RBUF 69A slot will be written into when a frame arrives through the data link via multiplexer ("Mux") 313B, CRC generate module 313A and EF (external proprietary format) module 314. EF module 314 encodes proprietary (i.e. non-standard) format frames to standard Fibre Channel 8B codes. Mux 313B receives input from Rx Spoof module 314A, which encodes frames to a proprietary format (if enabled). RWT 307 controls RBUF 69A write addresses and provides the slot number to tag writer ("TWT") 317.

RRD 319 processes frame transfer requests from RBUF 69A. Frames may be read out in any order and multiple destinations may get copies of the frames.

Steering state machine (SSM) 316 receives frames and determines the destination for forwarding the frame. SSM 316 produces a destination mask, where there is one bit for each destination. Any bit set to a certain value, for example, 1, specifies a legal destination, and there can be multiple bits set, if there are multiple destinations for the same frame (multicast or broadcast).

SSM 316 makes this determination using information from alias cache 315, steering registers 316A, control register 326 values and frame contents. IOP 66 writes all tables so that correct exit path is selected for the intended destination port addresses. Alias cache 315 based routing is described below in detail, according to one aspect of the present invention.

The destination mask from SSM 316 is sent to TWT 317 and a RBUF tag register (RTAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty and available for a new frame.

RTAG 318 also has frame content information that is passed to a requesting destination to pre-condition the destination for the frame transfer. These tags are transferred to the destination via a read multiplexer (RMUX) (not shown).

Transmit Segment of GL Port:

Transmit segment ("TPORT") 312 performs various transmit functions. Transmit tag register (TTAG) 330 provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARB 331 then reads the tag. For any given source, there are as many entries in TTAG 330 as there are credits in RBUF 69A.

TARB 331 is activated anytime there are one or more valid frame tags in TTAG 330. TARB 331 preconditions its controls for a frame and then waits for the frame to be written into TBUF 70A. After the transfer is complete, TARB 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate slot number. The output from Switch Mux 332 is sent to ALUT 323 for S_ID spoofing and the result is fed into TBUF Tags 333.

TMUX ("TxMux") 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A). TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides IOP 66 the means for transmitting frames for special purposes.

Frame multiplexer ("Frame Mux" or "Mux") 336 chooses the frame source, while logic (TX spoof 334) converts D_ID and S_ID from public to private addresses. Frame Mux 336 receives input from Tx Spoof module 334, TBUF tags 333, and Mux 335 to select a frame source for transmission.

EF module 338 encodes proprietary (i.e. non-standard) format frames to standard Fibre Channel 8B codes and CRC module 337 generates CRC data for the outgoing frames.

Modules 340-343 put a selected transmission source into proper format for transmission on an output link 344. Parity 340 checks for parity errors, when frames are encoded from 8B to 10B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20.

Common Segment of GL Port:

As discussed above, ASIC 20 include common segment 311 comprising of various modules. LPSM 320 has been described above and controls the general behavior of TPORT 312 and RPORT 310.

A loop look up table ("LLUT") 322 and an address look up table ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP 66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

XG Port

Figure 4A:
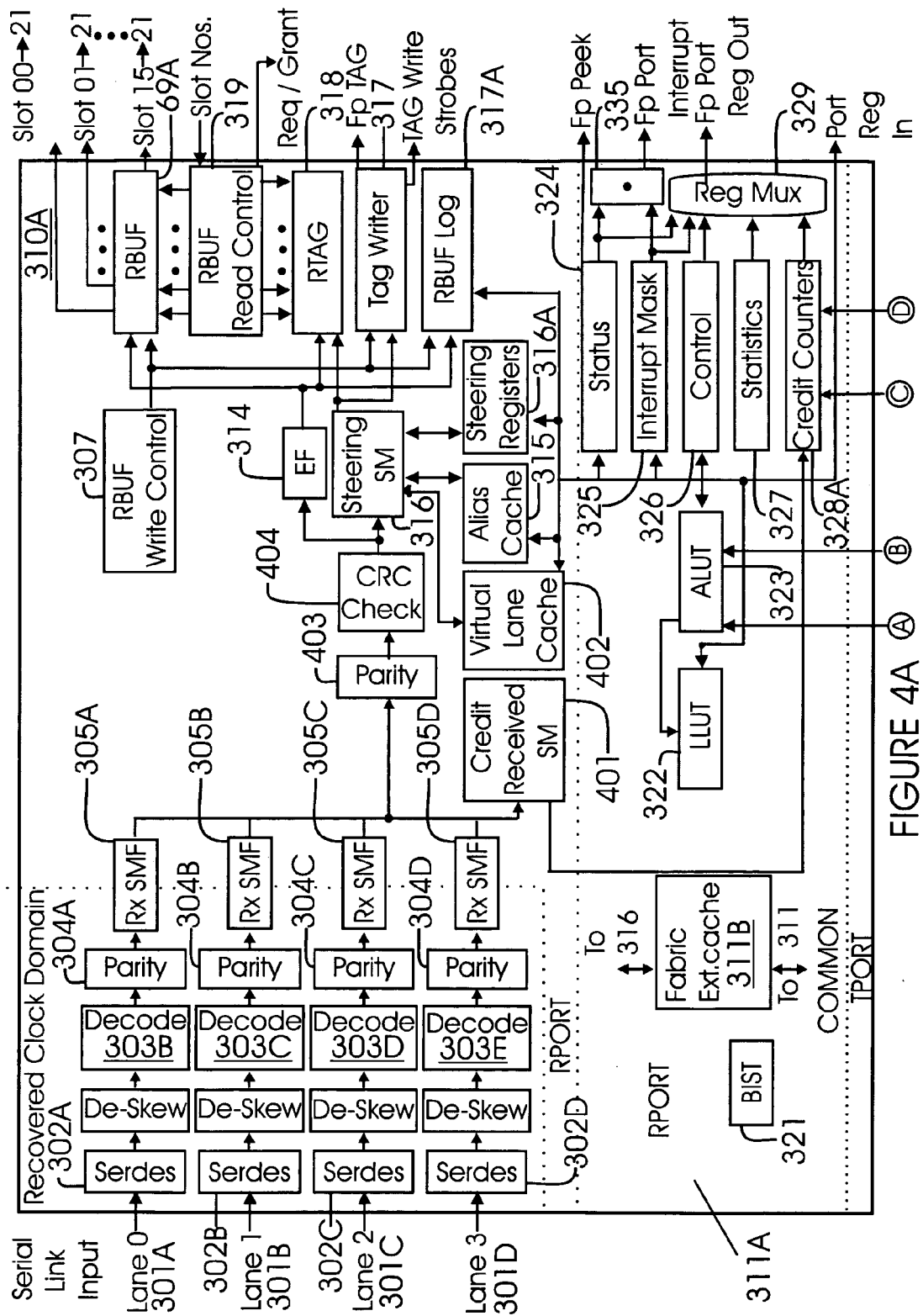
FIGS. 4A/4B (jointly referred to as FIG. 3) show a block diagram of XG_Port (10G) port, according to one aspect of the present invention.
Figure 4B:
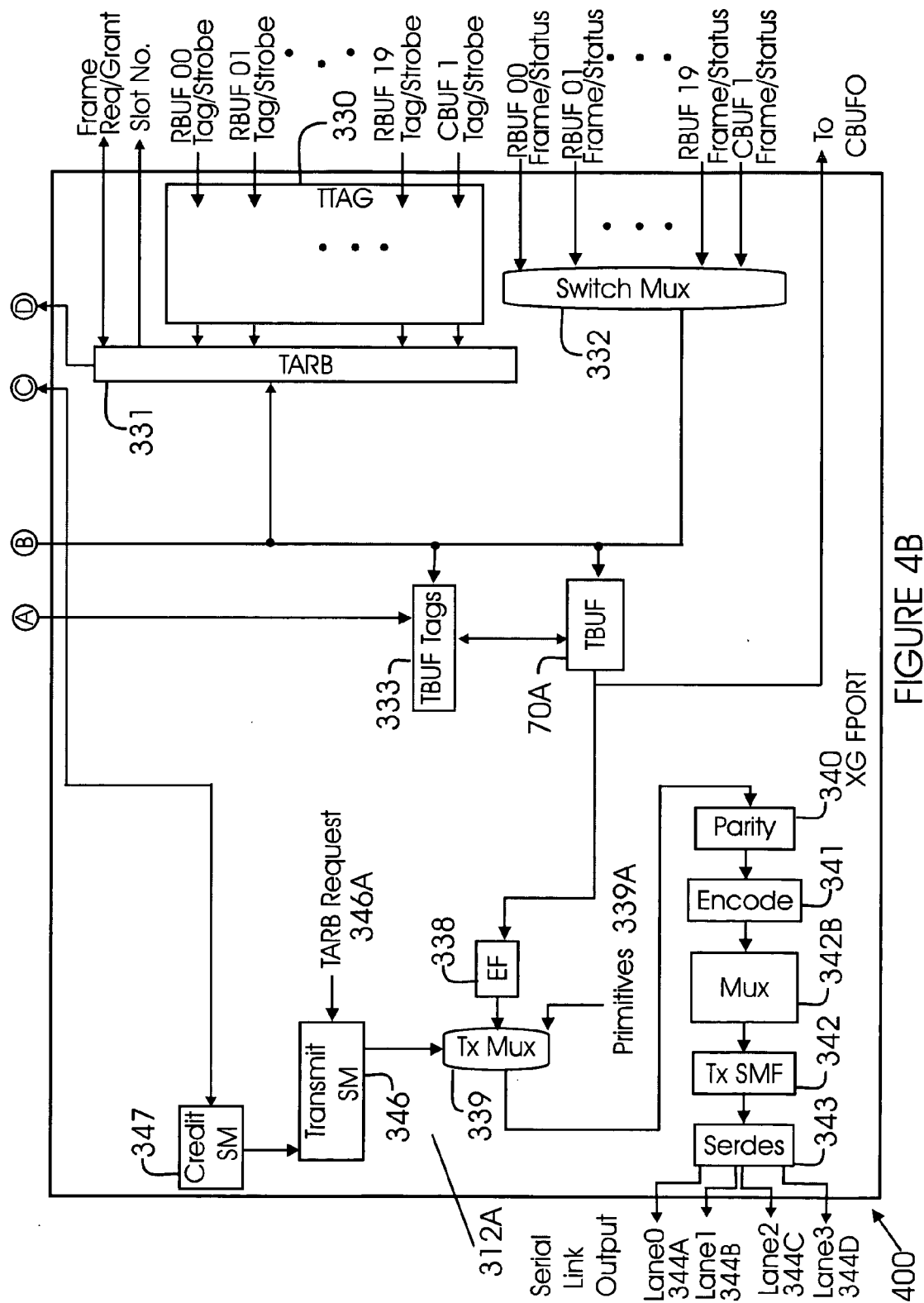

FIGS. 4A-4B (referred to as FIG. 4) show a block diagram of a 10G Fibre Channel port control module (XG FPORT) 400 used in ASIC 20. Various components of XG FPORT 400 are similar to GL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-302D), a de-skew module, a decode module (303B-303E) and parity module (304A-

304D). Each lane also has a smoothing FIFO (SMF) module 305A-305D that performs smoothing functions to accommodate clock frequency variations. Parity errors are checked by module 403, while CRC errors are checked by module 404.

RPORT 310A uses a virtual lane ("VL") cache 402 that stores plural vector values that are used for virtual lane assignment. In one aspect of the present invention, VL Cache 402 may have 32 entries and two vectors per entry. IOP 66 is able to read or write VL cache 402 entries during frame traffic. State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a smoothing FIFO ("Tx SMF") module 342 that handles clock variation on the transmit side. SERDES 343 then sends the data out to the link.

Virtual Fabrics

Figure 2A:
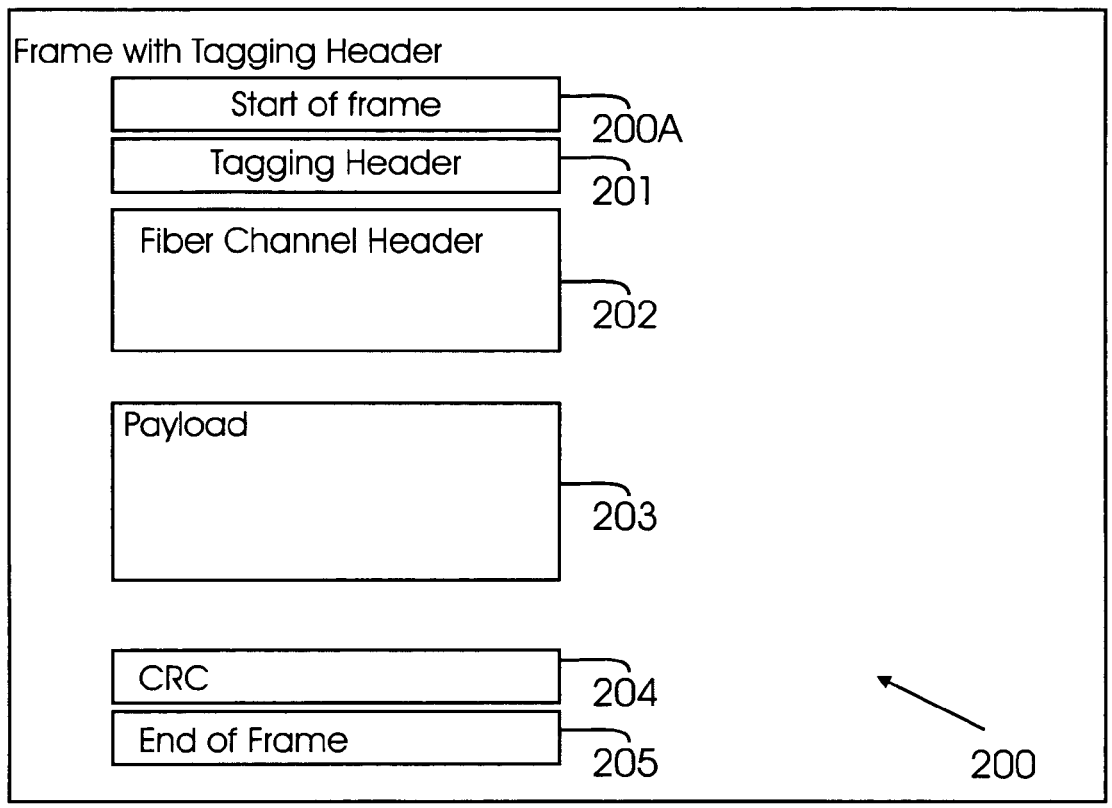
FIG. 2A shows a fibre channel frame with a tagging header, according to one aspect of the present invention.

FIG. 2A shows a fibre channel frame 200 with a tagging header 201. Frame 200 also includes a start of frame ("SOF") 200A, fibre channel header 202, pay load 203, cyclic redundancy code ("CRC") 204 and end of frame 205.

Figure 2B:
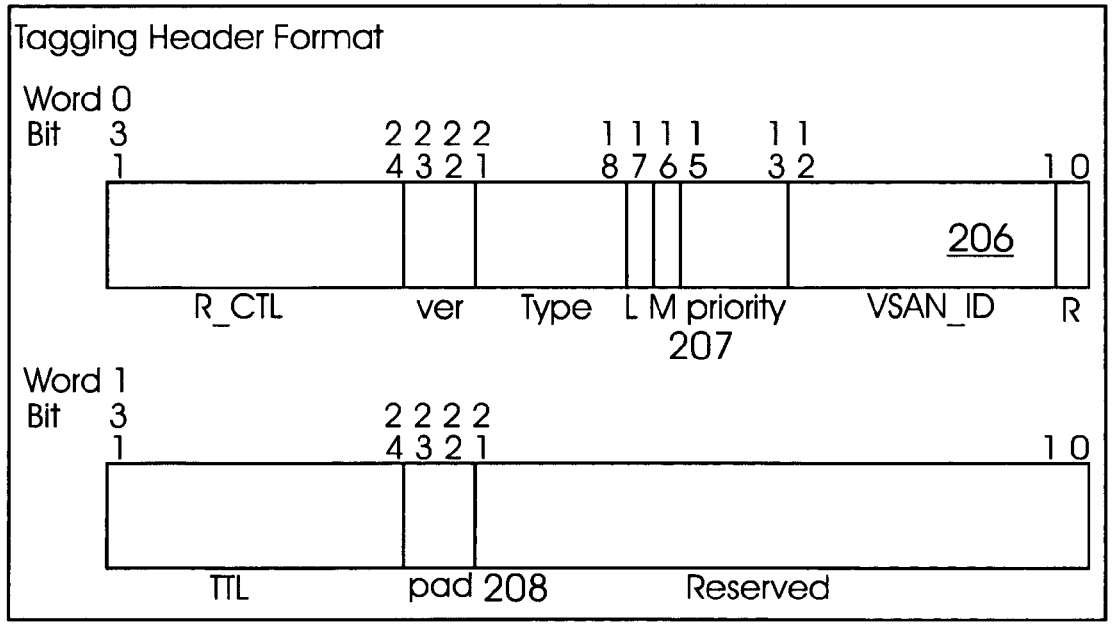
FIG. 2B shows a tagging header, according to one aspect of the present invention.

FIG. 2B shows a block diagram of tagging header 201 format/fields. Tagging header 201 includes a VSAN identifier ("VSAN_ID") 206. The VSAN_ID 206 specifies the virtual fabric of a frame.

Also, in Tagging header 201, the R_CTL field is set to a certain value to indicate a VSAN tagging header. The virtual fabric proposal requires it be set to hex 50 (*80 decimal). This value is reserved in a normal fibre channel header, as specified by FC-FS. In this case it is used to identify a Virtual Fabric Tagging Header.

The "ver" field in tagging header 201 specifies the version of the header. The "Type" field specifies the kind of encapsulated frame. For example, a value 0 identifies a fibre channel frame and a value of 8 includes an Ethernet frame. The "L" bit if set to a certain value, for example, 1, specifies one or more multi protocol switching labels, while the "M" bit if set to a certain value (for example, 1) specifies that more headers may be present. The priority field 207 specifies the priority of a frame. It is noteworthy that the priority field 207 may be disabled.

The TTL (time to live) field specifies the number of hops remaining before a frame may be dropped. For example, if the TTL field is 0, the frame is passed and if TTL field is 1, then the frame is dropped. The pad field 208 specifies the number of bytes that may be added to an encapsulated frame.

To support virtual fabrics, it is desirable that a fibre channel switch element should be able to do the following:

i. Recognize frames with the VSAN Tagging Header 201, and decode the header.

ii. Reject frames that do not have a VSAN_ID that matches one of the VSAN_IDs used for a particular port.

iii. Route frames according to the matching VSAN_ID. It is noteworthy that the same physical port may have different Domain ID values in the frame address for different VSANs.

iv. Handle multi-switch fabric procedures per fibre channel standard, FC-SW-2, for each Virtual Fabric, for Principal Switch selection, Domain ID assignment, and FSPF routing protocol.

v. Allow TF_Ports to have separate logins for different Virtual Fabrics on the same port.

vi. Share E_Ports among multiple Virtual Fabrics.

vii. Support "Encapsulation Mode" that adds a VSAN Tagging header 201 to frames received at a port, and strips off the Tagging header 201 from frames transmitted by a port. This allows ports connected to devices that do not support Virtual Fabrics to be part of a Virtual Fabric, with the VSAN_ID assigned by the switch.

viii. Support separate versions of Name Server, Management Server, Zoning, and other Fabric services, for each Virtual Fabric.

In one aspect of the present invention, the foregoing desirable features are incorporated in system 400 of FIG. 4 and/or 300 of FIG. 3. The various adaptive aspects of the present invention implement virtual fabrics using system 300/400 by providing at least the following:

A fabric extension cache 311B located in common port 311 that includes a cache table to match extension parameters (for example, VSAN_ID) of a frame used by system 300 needs to process the frame.

ALUT 323 also implements hard zoning capability for Encapsulation Mode. This allows devices that do not support virtual fabrics to be a part of a virtual fabric.

Virtual Fabric Control Register (VSCR):

This register (VSCR) is located in control register 326 and includes the following fields to control virtual fabrics, in one aspect of the present invention:

VSAN Mode Bit/field (the term bit and field are used interchangeably throughout this specification): This bit is set if Virtual Fabrics are enabled for a particular port and can be controlled by the switch firmware.

Encapsulation Mode Bit: This bit is set if a port performs Virtual Fabric Encapsulation, adding a Tagging Header to received frames, and stripping off the Tagging Header on transmit frames.

TTL Update: This bit is set if the TTL field in the Tagging Header is to be processed.

VSAN_ID: This field is used in the Encapsulation Mode for the VSAN_ID field of the Tagging Header and added to received frames.

TTL Field: This is used in the Encapsulation Mode for the TTL field of the Tagging Header added to received frames.

Priority Field: This is used in the Encapsulation Mode for the VSAN_ID field of the Tagging Header and added to received frames.

VSAN Reject Class 2 Policy: The policy determines disposition of class 2 frames that are rejected by VSAN hardware. For example:

Full frame is sent to IOP 66; and

The frame is discarded and status is set.

VSAN Reject Class 3 Policy: The policy determines disposition of class 3 frames rejected by VSAN hardware. For example:

The frame is sent to IOP 66; and

The frame is discarded and status is set. VSAN Preference Enable Bit: If this bit is set, it enables the processing of the Tagging Header Priority field 207. The number of priorities supported by the switch may be different than the number of priorities in the Tagging Header Priority field.

Figure 8:
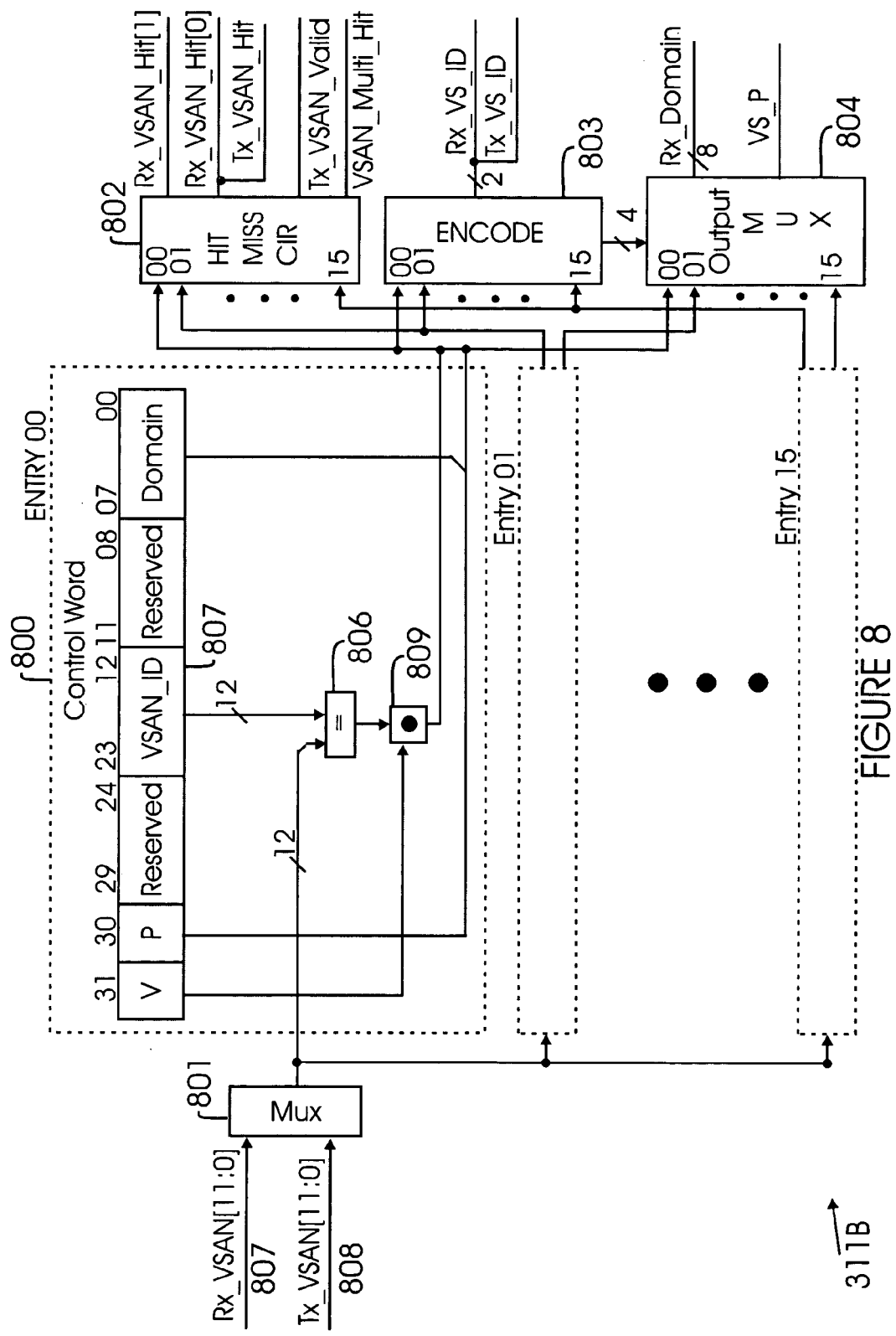
FIG. 8 is a block diagram of various fabric extension cache components, according to one aspect of the present invention.

Fabric Extension Cache 311B:

FIG. 8 shows a block diagram of a fabric extension cache 311B. Cache 311B can be programmed by ASIC 20 firmware to examine plural (and/or different fields) fields in an extended frame header. The term "cache" as used herein includes plural components rather than just "temporary" storage. Cache 311B (may also be referred to as VSAN Cache) is also shown in FIGS. 3A and 4A and may be located in common segment 311. Cache 311B is used to extend the capabilities of a switch element by processing information that is tagged or added to a frame header (for example, the tagging header 201 for VSANs fabric header or any field of interest). Also, although cache 311B, as shown in FIG. 8, can handle 16 entries, the present invention is not limited to any particular number of entries.

Turning in detail to FIG. 8, cache 311B includes control word 800, which includes plural bits for handling fabric extension functionality. For example, control word 800 includes a bit (designated "V") to indicate a valid entry; a "P" bit is intended for a priority frame action on matching entries, VSAN_ID 807 specifies the virtual fabric for a frame and is compared with field 206 of a tagging header 201.

Incoming VSAN_ID 807 (similar to VSAN_ID 206) for received frames (RX_VSAN) is compared to control word 800 entries by logic 806. Transmit side uses Tx_VSAN 808 and is compared to control word 800 entries. Mux 801 toggles between processing a frame on the receive side and transmit side.

Cache 311B includes a hit/miss module 802, which determines whether there is a hit or a miss. If the valid bit "V" (in control word 800) is set to a certain value, for example, 0, it will force a non-compare process step for the corresponding entry. As RPORT 310 processes frames, the frame word is compared against all entries that are valid resulting in either a hit or miss. The first few locations, for example, the first four locations are used to assign the VS_ID on F_ports or FL_Ports, while for E_ports all sixteen locations are used to generate the domain field.

The following explains the various outputs from hit miss module 802:

"Rx_VSAN_Hit[0]" output is active if a receive frame has a hit (or match) in the first few entries, for example, in the first 4 entries of the VSAN Cache table 500 (FIGS. 5A and 5B), and is inactive at other times. This indicates that the Rx_VS_ID field is valid.

The "Rx_VSAN_Hit[1]" output is active if a receive frame has a hit in any of the VSAN Cache table 500 entries, and is inactive at all other times. When "Rx_VSAN Hit[0]" is active, then "Rx_VSAN Hit[1]" is also active.

The "Tx_VSAN_Hit" output is active on a transmit frame hit in any of VSAN cache table 500 entries and is inactive at other times. Firmware can program cache table 500 differently for E_Ports, F_Ports and FL_Ports.

The "Tx_VSAN_Valid" output indicates when the transmit access is valid. A conflict may occur between the receive and transmit sides as resources are being shared. The receive side has priority over the transmit side. IOP 66 will have the lowest priority and waits for both the receive and transmit access, if necessary.

"VSAN_Cache_Mult_Hit" is set if there is a multiple hit (i.e. match in more than one entry). The highest priority hit entry provides the output (in this example, RX_Domain and VS_P). Entry 0 has the highest priority, and entry 15 has the lowest. Multiple hits are most likely an error by firmware programming of this feature/field.

Cache 311B also has an encoding module 803 that receives input from logic 809. The following describes the various outputs from Encoding module 803:

"Rx_VS_ID" is a VSAN_ID identifier that is assigned to a frame for use inside ASIC 20. This field is valid when "Rx_VSAN_Hit[0]" is active and is invalid or zero at other times. The "Rx_VS_ID" field provides steering column selections and VL_ID assignment.

"Tx_VS_ID" is a VSAN_ID identifier assigned to a frame for use inside ASIC 20. This field is valid when "Tx_VSAN_Hit" is active and is zero at other times. "Tx_VS_ID" is also for used S_ID Hard Zoning.

Cache 311B also includes an Output Mux 804 that receives an input from module 809 and generates the following outputs:

"Rx_Domain" is the domain field output from the receive side access. It is used to check the S_ID and for Domain or Area frame routing and is the Switch Domain assigned to a port for the selected VSAN_ID.

"VS_P" enables frame priority for corresponding matched VSAN_IDs. When active after a receive frame hit, it enables a VSAN frame to obtain routing preference if enabled at the transmitter.

Figure 5A:
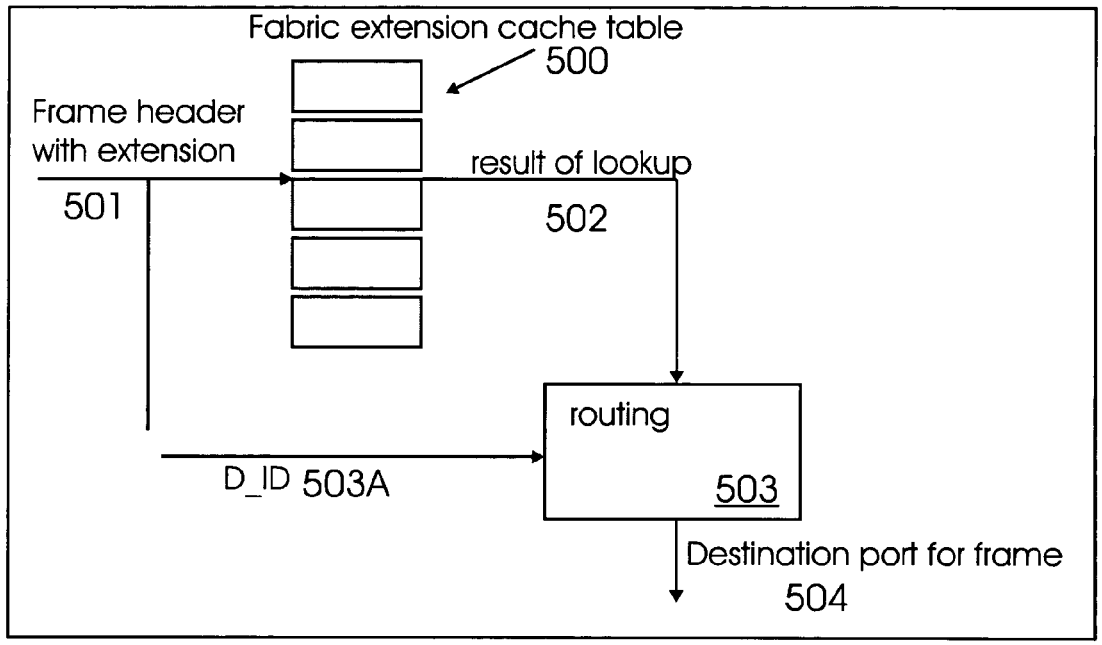
FIGS. 5A/5B show a fabric extension cache, used according to one aspect of the present invention.

FIG. 5A shows yet another block diagram of the fabric extension cache 311B (also referred to herein as cache 311B). In FIG. 5A, a frame header 501 with an extension is compared with the entries in cache table 500. The result of the comparison 502 is sent to a routing module 503 that sends the frame to destination port 504 based on result 502 and D_ID 503A. Routing module 503 includes various components and modules that have been described above with respect to FIGS. 3 and 4.

Figure 5B:
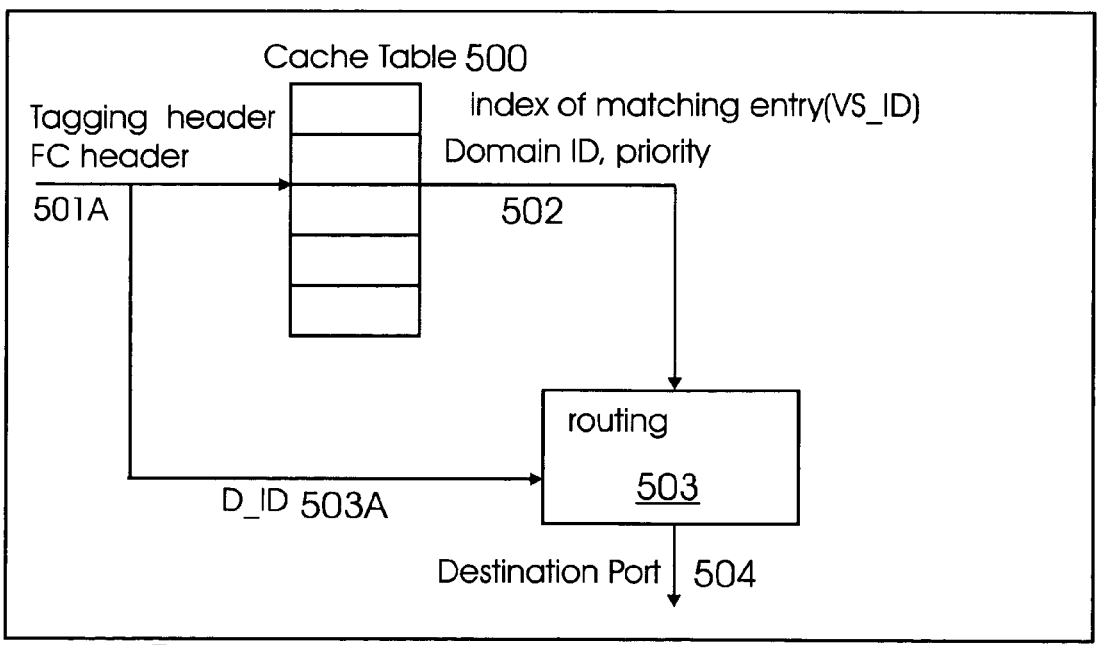

FIG. 5B shows a block diagram fabric extension cache 311B when used for virtual fabrics using a table with VSAN information. Cache 311B is used to determine whether a frame is a part of a virtual fabric that includes a particular port (the receiving port). Cache 311B also determines the local Domain ID for the port on the virtual fabric, so that routing module 503 can decide to route locally or to another switch.

Fibre channel frame 501A with tagging header 201 is received and compared by cache table 500 (may also be referred to as VSAN cache table 500 throughout this specification and used interchangeably). Various parameters, including VSAN_ID, Domain Id and frame priority may be compared. The result 502 is sent to routing module 503 that also receives D_ID 503A information to route the frame to a destination port 504.

The range of VSAN_IDs may be 1 to 4093. This increases the size of the routing table used by ports to route frames. If a full routing table is used for every possible VSAN_ID and Domain, the table will be 239 (number of possible domains per FC-SW-3) times 4094 (number of allowed VSAN_Ids). This will result in a table size of 978,466 entries. A routing table of this size will be expensive and inefficient because a given port is most likely to be a part of only a few virtual fabrics.

In one aspect of the present invention, a routing technique is provided such that a routing table is used for each port. VSAN cache 311B has an entry for each virtual fabric used by a particular port only. VSAN cache 311B maps N VSAN_Ids to M internal identifiers. N in this case is greater than M. In one aspect N includes 4096 entries and M includes 4 entries. This limits the size of the routing table and hence is cost-effective in reducing overall semiconductor die area, power and other parameters.

Processing Received Frames:

When a frame 501A with a tagging header 201 is received on a switch port with the virtual fabric field set, the VSAN cache table 500 is searched for an entry with a matching VSAN_ID, as shown in FIG. 5B. If no match is found, then it is assumed that the VSAN_ID is invalid and the frame is rejected. If a match is found, the Domain ID entry from the VSAN cache table 500 is compared to the Domain ID in the frame D_ID 503A.

If the Domain ID from VSAN Cache table 500 matches the Domain ID from the D_ID 503A of the frame, then the frame has a local destination and is routed to the local port identified by the lower 16 bits of frame D_ID field 503A by routing module 503.

It is noteworthy that the lower 16 bits of the address is the same for all Virtual Fabrics used by a port because the switch assigns the lower 16 bits of the address and always assign the same lower 16 bits of address for any Virtual Fabric used on a particular port. Therefore, all local destinations can use the same routing for any VSAN_ID. This means that the local routing table for destinations on the local switch does not need to be expanded to support multiple Virtual Fabrics. Since all possible local port destinations may not be in the same Virtual Fabric as the source frame, VSAN Cache table 500 is used to filter frames at the transmit port, as described below.

If the Domain ID from VSAN Cache table 500 does not match the Domain ID in D_ID 503A of the frame, then the frame is routed using the Domain table, with the Domain ID of D_ID 503A. VSAN Cache entry number (VS_ID) is also used to select a Domain routing table entry, as described below.

The priority to route a frame depends if a port's VSAN priority is enabled, a VSAN Tagging Header Priority field is set, a preference flag in the matching VSAN Cache table 500 entry is present, and the number of priorities implemented by a switch.

If a given port is a F_Port, then the S_ID of an incoming frame can be compared to the expected S_ID for the Virtual Fabric. The expected Domain field of the S_ID is the same as a matching VSAN Cache table 500 domain entry. The middle 8 bits of the expected S_ID (Area Field) are programmed in a register for a port.

In one aspect of the present invention, all Virtual Fabrics use the same middle 8 address bits, which are assigned by a switch. The low 8 bits are not checked, since loop ports or Virtual N_Port IDs may have many different values for a particular physical port.

FIG. 9A shows a flow diagram for processing received frames, according to one aspect of the present invention. The process starts in step S900. In step S901, the process determines if VSAN is enabled. This is achieved by checking the VSAN control register's VSAN Mode Bit/field.

If VSAN is not enabled, then in step S902, the switch accepts the frame and sets VS_ID to zero, and then sets the native Domain to a programmed value from the control registers and the frame is routed in step S903, as described with respect to the flow diagram in FIG. 9B.

If VSAN is enabled in step S901, then the process determines if the "Encapsulation Mode" is set. If it is set, the process goes to step S902.

If Encapsulation Mode is not set, then in step S905, the process begins at the first entry of cache table 500 (See FIG. 8). In step S906, the entry of table 500 (0th entry in FIG. 8) is compared to the frame VSAN_ID (501A, FIG. 5B). If there is no match, the process moves to the next entry in step S907.

In step S908, the process determines if all the cache table 500 entries have been compared. If all the entries have not been compared, the process moves back to step S906 to compare the next entry. If all the entries have been compared, the process determines, in step S909, if any match has been found. If yes, then the process moves to step S910, to route the frame, that is described below with respect to FIG. 9B.

If no match is found in step S909, the frame is rejected in step S911.

The foregoing process steps illustrate the adaptive aspects of the present invention, since all entries can be compared in parallel. Also, the present invention is not limited to comparing any particular number of entries.

Turning back to step S906, if a match was found, then is step S912, the process determines if this is the first match. If it is not the first match, then in step S912A, the process determines if the match was on entries 0-3. If yes, in step S914; a flag is set to indicate that a match was found. The VS_ID is set to the entry number and the port Domain is set to cache table 500 Domain entry value (Set RX_Hit[0], Set Rx_Hit[1]). If the entry was not 0-3 in step S912A, but VS_ID is set to "0", then in step S914A, only RX_Hit[1] is set.

If a match was already found on an entry in step S906, then step S912 will move the process to step S913, and then in step S913, the process sets a multiple hit status that allows firmware to generate an error message.

Processing Transmit Frames:

To handle transmission to a local F_Port destination, transmit frames also search the VSAN Cache table 500 for the VSAN_ID of a transmit frame. If there is no match, the frame is rejected in accordance to a policy set in the control registers. This violation also sets a status register and increments a statistics counter. The violation is treated similar to a hard-zoning violation.

This eliminates the need to verify a received frame's VSAN_ID against all local destination VSAN_IDs. Hence, a switch can support more VSAN_IDs than the size of the VSAN Cache table 500, as long as no individual port is a member of more Virtual Fabrics than the size of the VSAN Cache table 500.

If there is a match, the VSAN Cache table 500 entry becomes the VS_ID. This VS_ID is also used for hard zoning as described below.

FIG. 10 shows a process flow diagram for transmitting frames with the VSAN feature, according to one aspect of the present invention. The process starts in step S1000, and in step S1001, the process first determines if VSAN capability is enabled. If VSAN ability is enabled, in step S1002, the process determines, if the Encapsulation Mode is on. If the Encapsulation Mode is on, then, in step S1008, the process determines if hard zoning is enabled. If hard zoning is enabled, then the process moves to step S1011, described below with respect to FIG. 11. If hard zoning is not enabled, then the process moves to step S1010, to check Encapsulation, described below with respect to FIG. 12.

If in step S1002, the Encapsulation Mode is not on, then in step S1003, the process starts with the first VSAN cache table 500 entry. In step S1004, the process determines if the frame VSAN_ID matches with a VSAN cache table 500 entry. If there is a match (i.e. entries 0-3), then the process determines if it is the first match, in step S1005. If it is the first match, then in step S1006, the VS_ID is set to the cache table 500-entry value and Tx-Hit is set. It is not an entry within 0-3, then in step S1006A, VS_ID is set to 0 and Tx-Hit is set.

If it is not a first match in step S1005, then a multiple hit status is set in step S1007 and the process moves back to step S1012, described below.

In step S1004, if cache table 500 entry does not match a frame VSAN_ID, then in step S1012, the process moves to the next VSAN entry, until, the process determines in step S1013, if all cache table 500 entries have been compared. If not all entries have been compared, the process moves back to step S1004.

If all the cache entries have been compared, then in step S1014, the process determines if a match was found. If a match is found, then the process moves to step S1008.

If no match was found in step S1014, then the frame is rejected in step S1015 and the process is complete in step S1016.

Virtual Fabrics and Hard Zoning:

Fibre channel standard FC-GS-3 describes overall zoning requirements for Fibre Channel switches. Hard zoning is frame-by-frame enforcement of zoning by switch hardware. Hard zoning is enforced at the transmit port by comparing the transmit frame S_ID and VS_ID with a list of allowed values. Address Lookup Table (ALUT) 323 that has expected values for the VS_IDs enforces hard zoning:

The following contains information on various variables/bit-values used for matching a transmit frame. Each entry includes the following fields:

Domain—The high 8 bits (bits 16-23) of the 24 bit Fibre Channel address. This part of the address corresponds to the switch for a given VSAN_ID.

Area—The middle 8 bits (bits 8-15) of the 24 bit Fibre Channel address. This usually maps to a physical port on a switch.

Port—The low 8 bits (bits 0-7) of the 24 bit Fibre Channel address. This usually maps to the loop address (AL_PA) on switch ports that use Arbitrated Loop. But it may also map to assigned virtual N_Port Ids when a more recent Fibre Channel feature for sharing the same physical port with multiple N_Port addresses is used.

Compare mask —2 bit code specifying which ALUT 323 address fields to compare with the S_ID of the frame, for example:
0—slot not valid (compare always fails)
1—Compare Domain, Area, and Port fields.
2—Compare Domain and Area fields.
3—Compare Domain.

VS_ID—The entry number of a matching VSAN Cache 311B entry for a frame. If VSAN mode is disabled, this field is ignored. If there is no VSAN Cache 311B match, the frame was already rejected and does not get this far. If the VSAN mode is enabled, the VS_ID 606 from the VSAN Cache 311B matches the VS_ID entry in ALUT 323. Although the full VSAN_ID field could be used, using the VS_ID field saves die area.

Zone mask—A bit map representing the zones of a source port of a frame. The switch firmware assigns all zones for members on a physical port with a bit number. The maximum number of different zones that can be supported by devices on a port is only limited by the size of the bit map.

A compare with the frame S_ID is done on all ALUT 323 entries at the same time. If there is no match, or if there are multiple matches, the frame is rejected.

Frames with S_ID that start with hex 'F', that is an S_ID of the form hex 'Fxxxxx', hard zoning is ignored and the frame is sent.

Process Flow for Checking Hard Zoning:

FIG. 11 is a process flow diagram for hard zoning involving VSANs. In step S1100, the process compares ALUT 323 entries with a frame's S_ID.

If the entries don't match in step S1101, then in step S1106 the process determines if all the entries have been compared. If not, then in step S1105, the process moves to the next entry. If all ALUT 323 entries have been compared then in step S1107, the process determines if there has been a match. If there is no match, then the frame is rejected in step S1108 and the process is complete in step S1109.

If there is a match in step S1107, then in step S1110 the process determines, if there is more than one match. If yes, the frame is rejected in step S1108. If no, the process moves to step S1111 for LLUT 322 validation, described below with respect FIG. 12.

If in step S1101, the S_ID domain entry matches any of ALUT 323 entries, then in step S1102, the process determines if ALUT 323 zone mask is enabled for an Area compare. If yes, then in step S1112, the process determines if a frame S_ID Area value matches with ALUT 323 Area entries. If there is no match in step S1112, the process moves to step S1106. If there is a match in step S1112, the process moves to step S1103.

If ALUT 323 compare mask is not enabled in step S1102, then in step S1103, the process determines if ALUT 323 compare mask is enabled for Port compare. If yes, then in step S1113, the frame S_ID Port value is compared to ALUT 323 Port entry values. If there is no match, the process moves to step S1106. If there is a match, then the process moves to step S1104 and the process determines if VSAN mode is enabled. If VSAN mode is not enabled, then in step S1114 the zone map (703) is received from ALUT 323 and the process moves to step S1106.

If VSAN is enabled in step S1104, then in step S1115, the process compares VSAN cache table 500 VS_ID 606 value with ALUT 323 VS_ID values. If there is a match, the process moves to step S1114. If there is no match, then the process moves to step S1106.

It is noteworthy that process steps S1101, S1102, S1112, S1103, S1113, S1104 and S1115 could all be executed in parallel (simultaneously).

Figure 7:
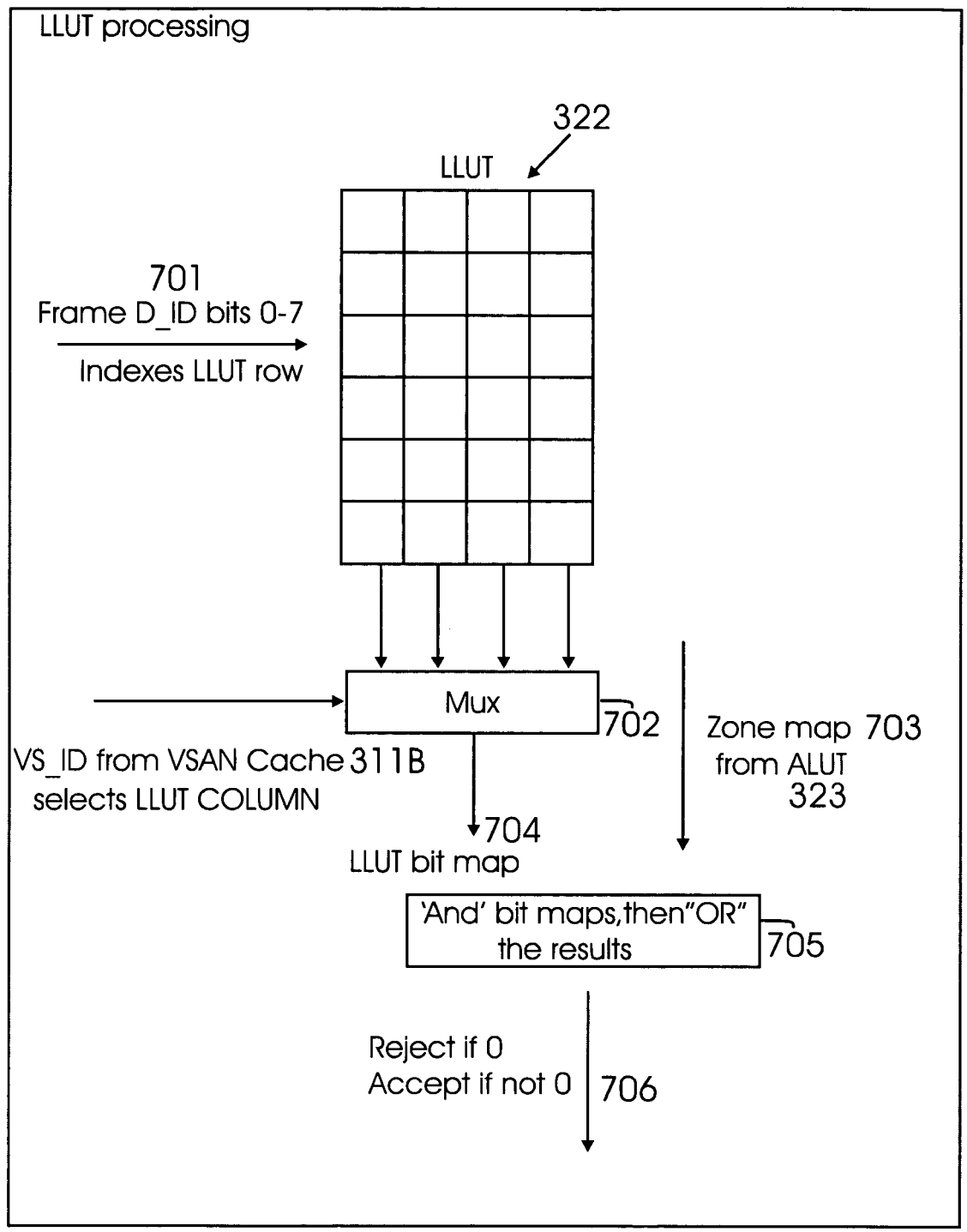
FIG. 7 shows a diagram for look table processing for routing fibre channel frames, according to one aspect of the present invention.

Loop Lookup Table 322:

FIG. 7 shows a block diagram of how LLUT 322 is used, according to one aspect of the present invention. LLUT 322 is indexed by the port value of the D_ID (701) of the frame to be transmitted (bits 0-7) and contains bit maps to compare with the zone mask of a matching ALUT 323 entry 703. For Virtual Fabrics, LLUT 322 entry contains a zone mask bit map for each possible VS_ID 606 generated by VSAN Cache 311B because each Virtual Fabric has its own independent zoning, with different zones for different Virtual Fabrics on the same physical device.

LLUT 322 entry is sent to Mux 702. VS_ID 606 provides the select signal to MUX 702. It selects the column from LLUT 322 to form the LLUT zone map (or bit map) 704. Entry 704 is compared to the zone map 703 from ALUT 323 by module 705. Thereafter, the entry is either rejected or accepted, based on the comparison. For example, the entry may be rejected if the value of 706 is 0 and accepted if the value is other than 0.

Figure 12:
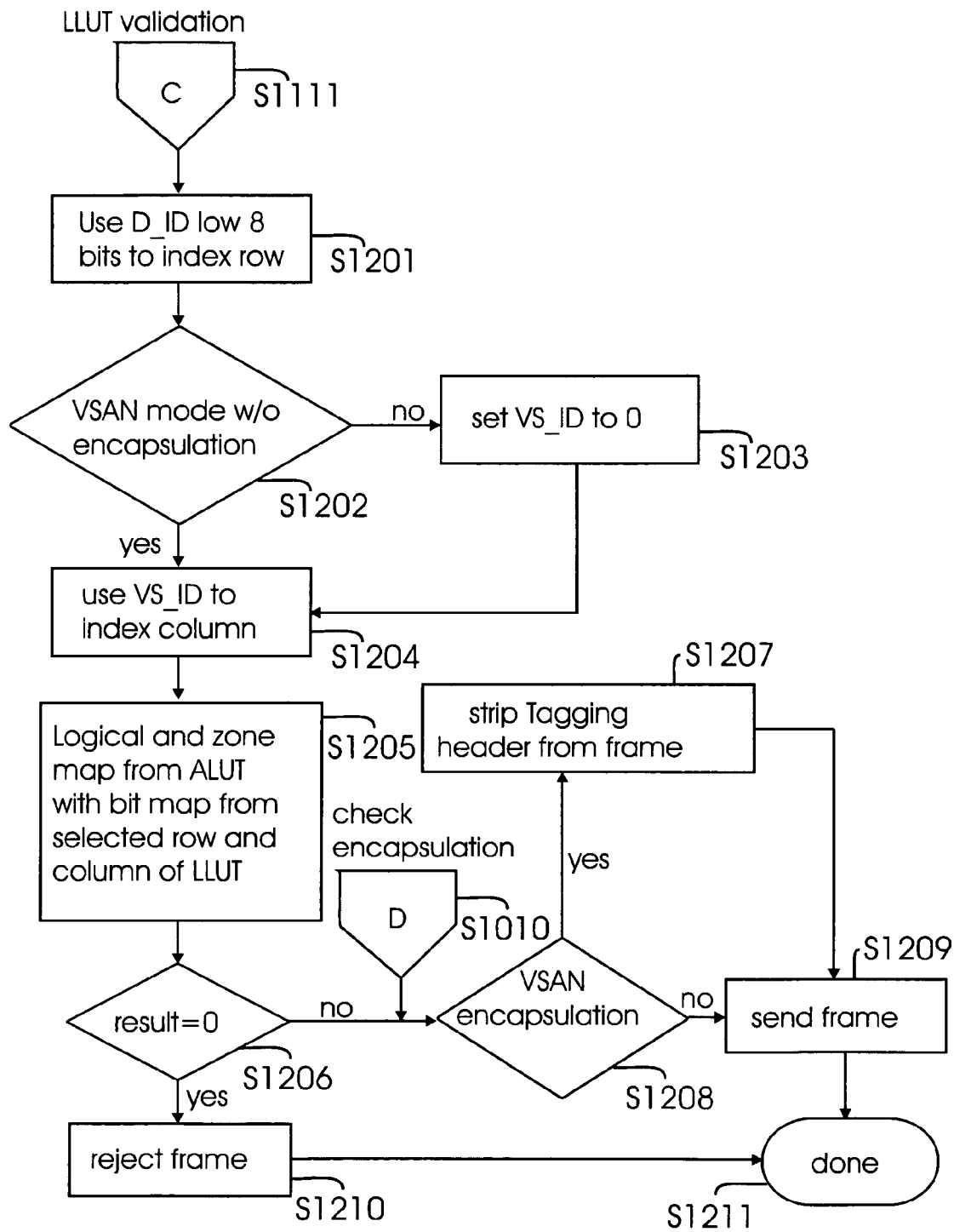
FIG. 12 is a process flow diagram for look up table validation, according to one aspect of the present invention.

FIG. 12 shows a process flow diagram of LLUT 322 validation, according to one aspect of the present invention. The process starts in step S1201, the low 8 bits if D_ID (701) are used to index table 322.

In step S1202, the process determines if VSAN mode is enabled without encapsulation. If not, then in step S1203, the VS_ID 606 is set to zero. If VSAN is enabled, then in step S1204, VS_ID 506 is used to select the column from LLUT 322.

In step S1205, the process performs a logical compare of the zone map 703 from ALUT 323 with the selected row and column of LLUT 322. If there is a no match, the result is zero (in step S1206) and the frame is rejected in step S1210.

If the result of the comparison, in step S1206, does produce a match (i.e. the result is not equal to zero), the process checks for encapsulation in step S1208. The process in step S1208 determines if there is VSAN encapsulation. If yes, then in step S1207, the tagging header is stripped from the frame and the frame is sent in step S1209, and then the process is complete in step S1211.

If there is no VSAN encapsulation in step S1208, the process moves to step S1209.

Virtual Fabric Area Routing:

The Area part of the Fibre Channel address is the middle 8 bits of the 24-bit address. This part is assigned by a switch during port login. It can correspond directly to a physical F_Port on the switch. In one aspect of the present invention, the switch always assigns the same Area address to all Virtual Fabric logins on the same physical port. The mechanism for routing frames within the switch, based on the Area part of the destination address, does not have to be extended for Virtual Fabrics, since the physical port always has the same Area, regardless of the Virtual Fabric.

Virtual Fabric Domain Routing:

A switch performs the Domain assignment procedure per fibre channel standard FC-SW-3 independently for each Virtual Fabric. The Virtual Fabrics may end up with different Domain Ids on the same switch. Thus an extension to the Domain routing is implemented to support Virtual Fabrics.

A column steering methodology for a Domain table, where a Domain table entry may have multiple routes depending on other criteria that may be used to route frames. This method is adapted to Virtual Fabrics by using the VS_ID output of VSAN Cache 311B to select the column in the Domain steering table.

Figure 6:
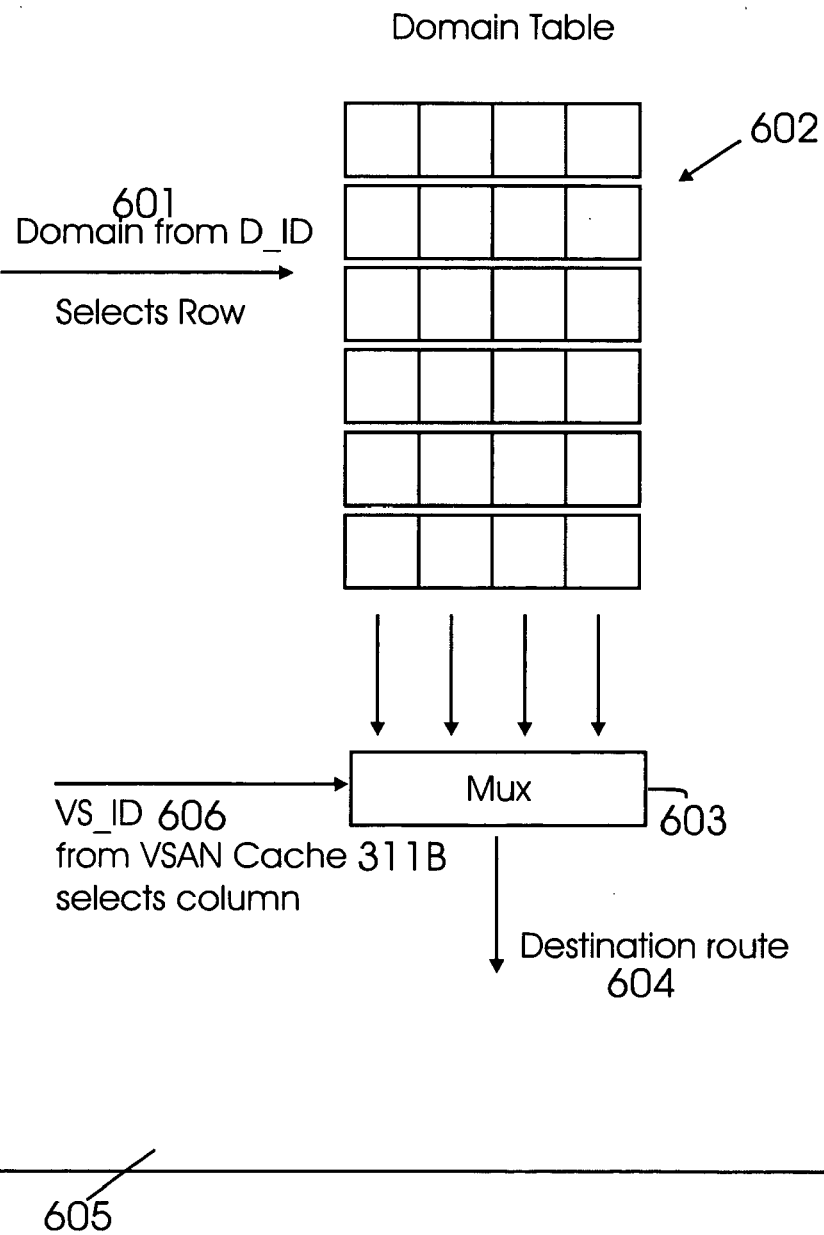
FIG. 6 shows a column steering diagram used according to one aspect of the present invention.

FIG. 6 shows a block diagram for column steering system 605, using VS_ID. System 605 includes a domain table 602 that receives Domain information (601) for selecting a row. The number of Virtual Fabrics that can be routed by Domain table 602 is the smaller of the number of VSAN Cache table 311B entries and the number of columns in the steering table. If VS_ID 606 is greater than the number of columns in cache table 500, the frame is rejected. The process for routing frames is discussed below with respect to FIG. 9B.

For Domain IDs that are not assigned for a particular Virtual Fabric, the corresponding column entry is invalid that causes the frame to be rejected. Also, to reduce die size, one valid signal/bit is used to reject an entire row, and the VSAN cache table 500 is used to reject frames for domains that are not assigned for a particular virtual fabric.

The control register 326 is used to control Domain table column selection and has an option to use VS_ID 606 for column selection.

The VS_ID 606 may also be used as additional address bits to select a region of memory, rather than columns. Thus, if a Domain table 602 does not use column steering, but has enough entries, it could be used for Virtual Fabric steering.

If the Domain table is 1024 entries long, the VS_ID 606 could select an offset to a region, 0-255, 256-511, etc, and the frame's Domain address would select the entry within that region.

Routing Process Flow:

FIG. 9B shows a flow diagram for routing frames, according to one aspect of the present invention.

In step S915, the process determines if the local Port Domain ID (or native Domain) matches the Domain value in the D_ID (601, FIG. 6). If it matches, then in step S916, the process determines if the local destination is valid. If the destination is valid, then in step S917, the process accepts the frame and routes it to the destination port, and the process is complete in step S918.

If local destination is not valid, then in step S922, the process rejects the frame and the process is completed in step S918.

In step S915, if the native Domain does not match with the D_ID Domain value, then in step S919, the process uses D_ID Domain value to index the Domain Steering Table 602 to select a row. In step S920, VS_ID (606) is used to select the steering table column from the row selected above. In step S921, the process determines if the row/column values are valid. If they are not valid, the process moves to step S922.

If the row/column values are valid, then in step S923, the destination port is based on the row and column information.

In step S924, the process determines, if the Encapsulation Mode is on. If the Encapsulation Mode is on, then a VSAN tagging header 201 is added to frames that are using VSCR fields. If the Encapsulation Mode is not on, then in step S925, the process accepts the frame and sends it to the destination port.

VSAN Encapsulation Mode:

As discussed above, to enable devices that do not support Virtual Fabrics to be part of a Virtual Fabric, a switch port can use the VSAN Encapsulation Mode. The port adds Tagging Header 201 to received frames, and removes them from transmit frames. All received frames are assumed to not include Tagging Header 201. The switch port inserts the tagging header 201 using the values in the VSCR control register described above. All transmit frames are assumed to have Tagging Header 201 and the switch port removes the header before transmission. A port in Encapsulation Mode is a part of a Virtual Fabric.

Extending Encapsulation Mode for Virtual N Port Ids:

If VSAN Encapsulation Mode and Virtual N_Port Id (that assigns multiple addresses to a particular N_Port, per fibre channel standard FC-FS) features are used, the Fabric Extension cache 311B may operate in a mode where different Virtual N_Port IDs are used in different Virtual Fabrics. The assignment of Virtual N_Port IDs to Virtual Fabric VSAN_IDs is configured on the switch.

Each time a new Virtual N_port ID is assigned by a switch port (the low 8 bits of the Fibre Channel address for the port), the configuration is checked to see if it has a VSAN_ID defined for it. If so, an entry is written to cache table 500 that contains the Virtual N_Port Id and the VSAN_ID.

When a frame is received, cache table 500 is searched for that Virtual N_Port ID. If there is a match, the VSAN_ID in the entry is used when the Tagging Header 201 is added. The rest of the Tagging Header fields may come from the VSCR or the fabric extension cache 311B. The assignment function may be accomplished by using the virtual N_Port ID to index a table of VSCR registers.

Extending Encapsulation Mode on an E Port:

In one aspect of the present invention, Encapsulation Mode is extended to an E_Port attached to a switch that in turn is attached to other switches that do not support Virtual Fabrics. The Fabric Extension Cache 311B operates in a mode where it searches for the Domain ID of a received frame. If a cache entry is found with a matching Domain ID, the VSAN_ID in the cache table 500 is used for adding the Tagging Header 201 to the frame. This allows multiple Domains that do not support Virtual Fabrics to be part of different Virtual Fabrics. This same function could be accomplished by using the frame S_ID to index a table of VSCR registers. This table of registers may be contained in any type of memory structure.

If area routing can be used (i.e. D_ID of a frame is equal to 1 for a switch receiving the frame), then plural E_ports may be shared for plural VSANs. A reduced routing table is used for the number of supported VSANs on a switch element 20.

In one aspect of the present invention, F_ports and FL_Ports support 4 VSANs, while E_ports support up to 16 VSANs. Hence by increasing the number of VSAN cache 311B entries from 4 to 16, ASIC 20 can support 16 VSANs.

It is noteworthy that the foregoing processes, procedures and circuits used for VSAN fabric extension are also applicable to any other fabric extension features or methods.

Although the present invention has been described with reference to specific embodiments, these embodiments are illustrative only and not limiting. Many other applications and embodiments of the present invention will be apparent in light of this disclosure and the following claims.

What is claimed is:

1. A fibre channel switch element used for routing fibre channel frames, comprising:

a port having a receive segment for receiving fibre channel frames; a transmit segment for transmitting fibre channel frames virtual storage area network cache for generating a zone mask of a matching entry; and a common segment for storing a look up table that is indexed by port values of a frame's destination identifier (D_ID) and a bit map to compare with the zone mask of the matching entry cache generated by the virtual storage area network ("VSAN") cache; wherein if the VSAN cache entry is to select a column from the look up table, a logical comparison is performed between the zone map and look up table entries; and if there is no match after the comparison and an encapsulation mode is enabled, then a tagging header is stripped from a frame before the frame is transmitted by the transmit segment.

2. A fibre channel switch element for routing fibre channel frames, comprising:

a plurality of ports for receiving and transmitting fibre channel frames, each port having:
a receive segment for receiving fibre channel frames;
a transmit segment for transmitting fibre channel frames;
a virtual storage area network ("VSAN") cache for generating a VSAN identifier; and
a common segment having a control register for controlling column selection from a domain table; wherein the domain table having a plurality of columns is used for routing fibre channel frames;
wherein a column of the domain table is selected to route frames based on the VSAN identifier generated from the VSAN cache; and
wherein if a domain identifier is not assigned for a virtual fabric, then a frame for the virtual fabric is rejected.

* * * * *

UNITED STATES PATENT AND TRADEMARK OFFICE
CERTIFICATE OF CORRECTION

PATENT NO. : 7,684,401 B2  Page 1 of 2
APPLICATION NO. : 10/894547
DATED : March 23, 2010
INVENTOR(S) : Frank R. Dropps It is certified that error appears in the above-identified patent and that said Letters Patent is hereby corrected as shown below:

On the first page, in field (57), in column 2, in "Abstract", line 1, after "A" delete "fiber" and insert -- fibre --, therefor.

On the first page, in field (57), in column 2, in "Abstract", line 1, after "routing" delete "fiber" and insert -- fibre --, therefor.

On page 4, in column 2, under "Other Publications", line 42, delete ""Notice" and insert -- "Notice of --, therefor.

On page 5, in column 2, under "Other Publications", line 69, delete "Managament" and insert -- Management --, therefor.

On page 6, in column 1, under "Other Publications", line 57, delete "Networks." and insert -- Network. --, therefor.

On page 6, in column 2, under "Other Publications", line 16, delete "1/956,718," and insert -- 10/956,718, --, therefor.

On page 6, in column 2, under "Other Publications", line 22, delete "Allownce" and insert -- Allowance --, therefor.

On page 6, in column 2, under "Other Publications", line 42, delete "Allownce" and insert -- Allowance --, therefor.

In column 13, line 38, delete ""Rx_VSAN Hit[0]"" and insert -- "Rx_VSAN_Hit[0]" --, therefor.

In column 13, line 39, delete ""Rx_VSAN Hit[1]"" and insert -- "Rx_VSAN_Hit[1]" --, therefor.

In column 21, line 7, in claim 1, delete "frames virtual" and insert -- frames; a virtual --, therefor.

Signed and Sealed this

Twenty-sixth Day of October, 2010

David J. Kappos
*Director of the United States Patent and Trademark Office*

In column 21, line 12, in claim 1, after "entry" delete "cache".

In column 21, line 14, in claim 1, delete "is to" and insert -- is used to --, therefor.